(12) United States Patent
Ishii et al.

(10) Patent No.: US 7,636,394 B2
(45) Date of Patent: Dec. 22, 2009

(54) COMPRESSION ENCODER, COMPRESSION-ENCODING METHOD, RECORDER, AND RECORDING METHOD

(75) Inventors: Mikio Ishii, Kanagawa (JP); Hiroshi Higuchi, Kanagawa (JP); Katsuhiko Tsushima, Kanagawa (JP)

(73) Assignee: Sony Corporation, Tokyo (JP)

( * ) Notice: Subject to any disclaimer, the term of this patent is extended or adjusted under 35 U.S.C. 154(b) by 799 days.

(21) Appl. No.: 10/816,027

(22) Filed: Apr. 1, 2004

(65) Prior Publication Data

US 2004/0258399 A1 Dec. 23, 2004

(30) Foreign Application Priority Data

Apr. 2, 2003 (JP) ............... 2003-099328

(51) Int. Cl.
*H04N 7/12* (2006.01)
*H04N 11/02* (2006.01)
(52) U.S. Cl. ............................. 375/240.26
(58) Field of Classification Search ............. 375/240.26
See application file for complete search history.

(56) References Cited

U.S. PATENT DOCUMENTS

| 5,146,324 | A | * | 9/1992 | Miller et al. | 375/240.03 |
| 5,301,018 | A | * | 4/1994 | Smidth et al. | 375/240.24 |
| 5,649,048 | A | | 7/1997 | Tomita et al. | |
| 5,847,760 | A | * | 12/1998 | Elmaliach et al. | 348/390.1 |
| 6,681,052 | B2 | * | 1/2004 | Luna et al. | 382/250 |
| 6,714,591 | B1 | * | 3/2004 | Katata et al. | 375/240.08 |
| 7,227,900 | B2 | * | 6/2007 | Porter et al. | 375/240.27 |
| 2003/0138051 | A1 | * | 7/2003 | Chen et al. | 375/240.26 |

FOREIGN PATENT DOCUMENTS

| JP | 2 171090 | 7/1990 |
| JP | 2001 285802 | 10/2001 |

* cited by examiner

*Primary Examiner*—Tung Vo
*Assistant Examiner*—Anner Holder
(74) *Attorney, Agent, or Firm*—Frommer Lawrence & Haug LLP; William S. Frommer; Ellen Marcie Emas

(57) ABSTRACT

The number of decoders necessary for ½-speed reproduction is reduced and deterioration in resolution is restricted without necessitating an interpolation processing. First digital image signals and second digital image signals having a different frame rate from that of the first digital image signals are compressed on the basis of one same encoding system. Based on a method of rearranging macro blocks of the second digital image signals, the macro blocks of the first digital image signals are rearranged, so that the respective digital image signals compression-encoded and outputted can have macro block layouts equivalent to each other.

31 Claims, 19 Drawing Sheets

| 422 (YPbPr) | FIRST DIGITAL IMAGE SIGNALS | SECOND DIGITAL IMAGE SIGNALS |
| --- | --- | --- |
| | 422 (60P) | 422 (30P) |
| 1920*1080 | TWO DECODERS (900Mbps) | ONE DECODER (450Mbps) |
| 1280*720 | NOT COMPATIBLE | ONE DECODER (450Mbps) |

FIG.2A

| | RECORDING 422(60P) TAPE | 1/2-SPEED REPRODUCTION 422(30P) WITHOUT INTERPOLATION |
| --- | --- | --- |
| 1920*1080 | TWO DECODERS (900Mbps) | ONE DECODER (450Mbps) |

FIG.2B

SECOND DIGITAL IMAGE SIGNALS 422 (30P)

| MBU | SHUFFLING GROUPS A AND B | MBU | SHUFFLING GROUPS C AND D |
|---|---|---|---|
| 0 | A0, A10, A20, A30, ⋯A2030 | 20 | C0, C10, C20, C30, ⋯C2030 |
| 1 | B0, B10, B20, B30, ⋯B2030 | 21 | D0, D10, D20, D30, ⋯D2030 |
| 2 | A1, A11, A21, A31, ⋯A2031 | 22 | C1, C11, C21, C31, ⋯C2031 |
| 3 | B1, B11, B21, B31, ⋯B2031 | 23 | D1, D11, D21, D31, ⋯D2031 |
| 4 | A2, A12, A22, A32, ⋯A2032 | 24 | C2, C12, C22, C32, ⋯C2032 |
| 5 | B2, B12, B22, B32, ⋯B2032 | 25 | D2, D12, D22, D32, ⋯D2032 |
| 6 | A3, A13, A23, A33, ⋯A2033 | 26 | C3, C13, C23, C33, ⋯C2033 |
| 7 | B3, B13, B23, B33, ⋯B2033 | 27 | D3, D13, D23, D33, ⋯D2033 |
| 8 | A4, A14, A24, A34, ⋯A2034 | 28 | C4, C14, C24, C34, ⋯C2034 |
| 9 | B4, B14, B24, B34, ⋯B2034 | 29 | D4, D14, D24, D34, ⋯D2034 |
| 10 | A5, A15, A25, A35, ⋯A2035 | 30 | C5, C15, C25, C35, ⋯C2035 |
| 11 | B5, B15, B25, B35, ⋯B2035 | 31 | D5, D15, D25, D35, ⋯D2035 |
| 12 | A6, A16, A26, A36, ⋯A2036 | 32 | C6, C16, C26, C36, ⋯C2036 |
| 13 | B6, B16, B26, B36, ⋯B2036 | 33 | D6, D16, D26, D36, ⋯D2036 |
| 14 | A7, A17, A27, A37, ⋯A2037 | 34 | C7, C17, C27, C37, ⋯C2037 |
| 15 | B7, B17, B27, B37, ⋯B2037 | 35 | D7, D17, D27, D37, ⋯D2037 |
| 16 | A8, A18, A28, A38, ⋯A2038 | 36 | C8, C18, C28, C38, ⋯C2038 |
| 17 | B8, B18, B28, B38, ⋯B2038 | 37 | D8, D18, D28, D38, ⋯D2038 |
| 18 | A9, A19, A29, A39, ⋯A2039 | 38 | C9, C19, C29, C39, ⋯C2039 |
| 19 | B9, B19, B29, B39, ⋯B2039 | 39 | D9, D19, D29, D39, ⋯D2039 |

FIG.4

MACRO BLOCKS TO BE RECORDED IN TWELVE BLOCKS IN THE FIRST HALF

| A0 | B0 | C0 | D0 | A1 | B1 | C1 | D1 |
|---|---|---|---|---|---|---|---|
| D30 | C30 | B30 | A30 | D31 | C31 | B31 | A31 |
| A60 | B60 | C60 | D60 | A61 | B61 | C61 | D61 |
| D90 | C90 | B90 | A90 | D91 | C91 | B91 | A91 |

: LOST MACRO BLOCKS

MACRO BLOCKS TO BE RECORDED IN TWELVE BLOCKS IN THE LAST HALF

| A0 | B0 | C0 | D0 | A1 | B1 | C1 | D1 |
|---|---|---|---|---|---|---|---|
| D30 | C30 | B30 | A30 | D31 | C31 | B31 | A31 |
| A60 | B60 | C60 | D60 | A61 | B61 | C61 | D61 |
| D90 | C90 | B90 | A90 | D91 | C91 | B91 | A91 |

: LOST MACRO BLOCKS

FIRST DIGITAL IMAGE SIGNALS 422 (60P)

| Enc_A | SHUFFLING GROUPS A AND C | Enc_B | SHUFFLING GROUPS B AND D |
|---|---|---|---|
| MBU | | MBU | |
| 0 | A0, A10, A20, A30, ···A2030 | 1 | B0, B10, B20, B30, ···B2030 |
| 2 | A1, A11, A21, A31, ···A2031 | 3 | B1, B11, B21, B31, ···B2031 |
| 4 | A2, A12, A22, A32, ···A2032 | 5 | B2, B12, B22, B32, ···B2032 |
| 6 | A3, A13, A23, A33, ···A2033 | 7 | B3, B13, B23, B33, ···B2033 |
| 8 | A4, A14, A24, A34, ···A2034 | 9 | B4, B14, B24, B34, ···B2034 |
| 10 | A5, A15, A25, A35, ···A2035 | 11 | B5, B15, B25, B35, ···B2035 |
| 12 | A6, A16, A26, A36, ···A2036 | 13 | B6, B16, B26, B36, ···B2036 |
| 14 | A7, A17, A27, A37, ···A2037 | 15 | B7, B17, B27, B37, ···B2037 |
| 16 | A8, A18, A28, A38, ···A2038 | 17 | B8, B18, B28, B38, ···B2038 |
| 18 | A9, A19, A29, A39, ···A2039 | 19 | B9, B19, B29, B39, ···B2039 |
| 20 | C0, C10, C20, C30, ···C2030 | 21 | D0, D10, D20, D30, ···D2030 |
| 22 | C1, C11, C21, C31, ···C2031 | 23 | D1, D11, D21, D31, ···D2031 |
| 24 | C2, C12, C22, C32, ···C2032 | 25 | D2, D12, D22, D32, ···D2032 |
| 26 | C3, C13, C23, C33, ···C2033 | 27 | D3, D13, D23, D33, ···D2033 |
| 28 | C4, C14, C24, C34, ···C2034 | 29 | D4, D14, D24, D34, ···D2034 |
| 30 | C5, C15, C25, C35, ···C2035 | 31 | D5, D15, D25, D35, ···D2035 |
| 32 | C6, C16, C26, C36, ···C2036 | 33 | D6, D16, D26, D36, ···D2036 |
| 34 | C7, C17, C27, C37, ···C2037 | 35 | D7, D17, D27, D37, ···D2037 |
| 36 | C8, C18, C28, C38, ···C2038 | 37 | D8, D18, D28, D38, ···D2038 |
| 38 | C9, C19, C29, C39, ···C2039 | 39 | D9, D19, D29, D39, ···D2039 |

FIG.8

| C29 | D29 | | |
|---|---|---|---|
| G29 | H29 | | |
| F59 | E59 | | |
| B59 | A59 | | |
| | | B1019 | A1019 |

(large blank gap)

| B0 | A0 | | |
|---|---|---|---|
| C0 | | | |
...

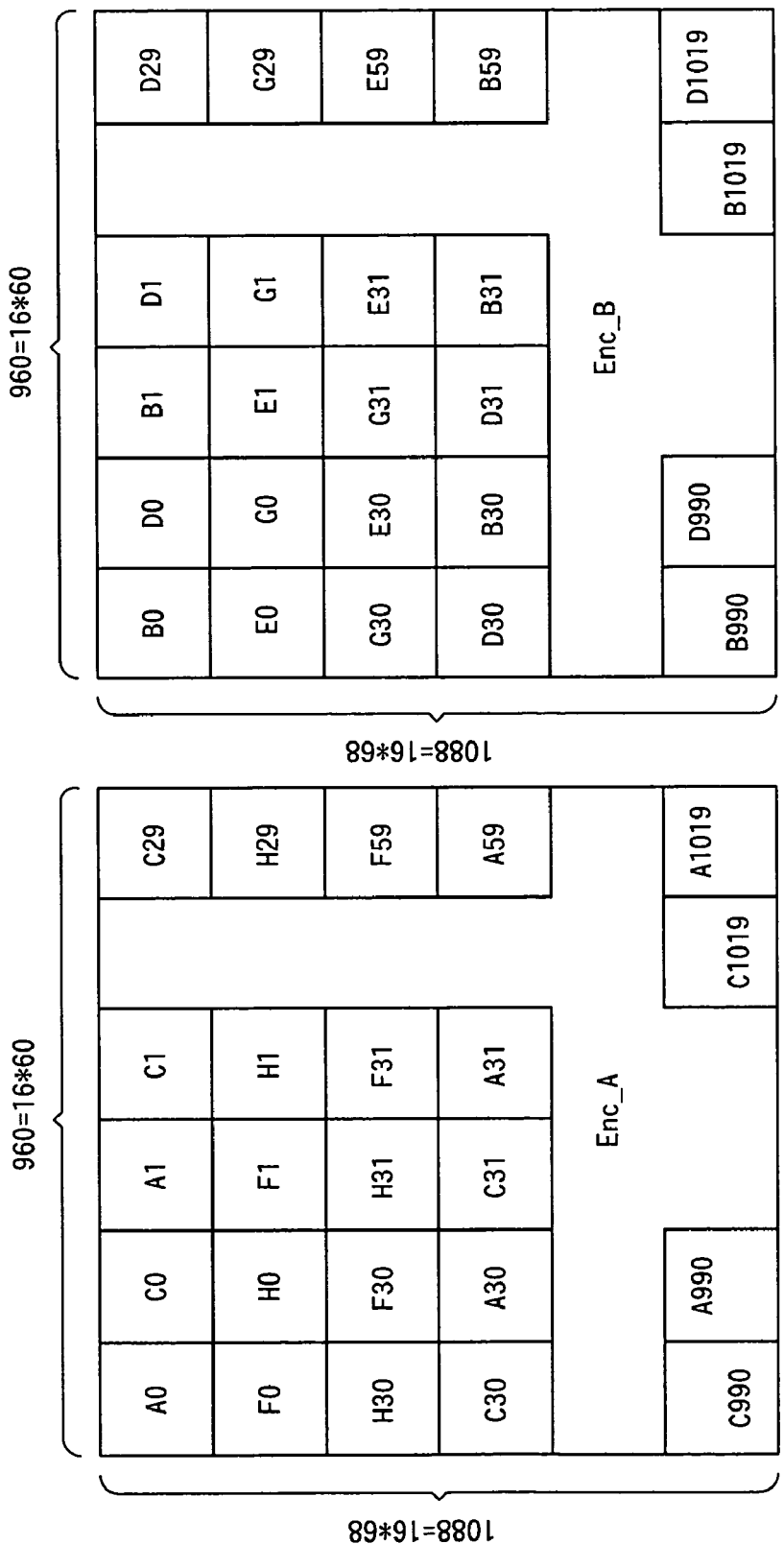

SECOND DIGITAL IMAGE SIGNALS 444 (30P)

| Enc_A MBU | SHUFFLING GROUPS A, C, F AND H | Enc_B MBU | SHUFFLING GROUPS B, D, E AND G |
|---|---|---|---|
| 0 | A0, A5, A10, A15, ⋯A1015 | 1 | B0, B5, B10, B15, ⋯B1015 |
| 2 | H0, H5, H10, H15, ⋯H1015 | 3 | G0, G5, G10, G15, ⋯G1015 |
| 4 | A1, A6, A11, A16, ⋯A1016 | 5 | B1, B6, B11, B16, ⋯B1016 |
| 6 | H1, H6, H11, H16, ⋯H1016 | 7 | G1, G6, G11, G16, ⋯G1016 |
| 8 | A2, A7, A12, A17, ⋯A1017 | 9 | B2, B7, B12, B17, ⋯B1017 |
| 10 | H2, H7, H12, H17, ⋯H1017 | 11 | G2, G7, G12, G17, ⋯G1017 |
| 12 | A3, A8, A13, A18, ⋯A1018 | 13 | B3, B8, B13, B18, ⋯B1018 |
| 14 | H3, H8, H13, H18, ⋯H1018 | 15 | G3, G8, G13, G18, ⋯G1018 |
| 16 | A4, A9, A14, A19, ⋯A1019 | 17 | B4, B9, B14, B19, ⋯B1019 |
| 18 | H4, H9, H14, H19, ⋯H1019 | 19 | G4, G9, G14, G19, ⋯G1019 |
| 20 | F0, F5, F10, F15, ⋯F1015 | 21 | E0, E5, E10, E15, ⋯E1015 |
| 22 | C0, C5, C10, C15, ⋯C1015 | 23 | D0, D5, D10, D15, ⋯D1015 |
| 24 | F1, F6, F11, F16, ⋯F1016 | 25 | E1, E6, E11, E16, ⋯E1016 |
| 26 | C1, C6, C11, C16, ⋯C1016 | 27 | D1, D6, D11, D16, ⋯D1016 |
| 28 | F2, F7, F12, F17, ⋯F1017 | 29 | E2, E7, E12, E17, ⋯E1017 |
| 30 | C2, C7, C12, C17, ⋯C1017 | 31 | D2, D7, D12, D17, ⋯D1017 |
| 32 | F3, F8, F13, F18, ⋯F1018 | 33 | E3, E8, E13, E18, ⋯E1018 |
| 34 | C3, C8, C13, C18, ⋯C1018 | 35 | D3, D8, D13, D18, ⋯D1018 |
| 36 | F4, F9, F14, F19, ⋯F1019 | 37 | E4, E9, E14, E19, ⋯E1019 |
| 38 | C4, C9, C14, C19, ⋯C1019 | 39 | D4, D9, D14, D19, ⋯D1019 |

FIG.13

FIRST DIGITAL IMAGE SIGNALS 444 (60P)

| Enc_A | SHUFFLING GROUPS A AND F | Enc_B | SHUFFLING GROUPS B AND E |
|---|---|---|---|
| MBU | | MBU | |
| 0 | A0, A5, A10, A15, ⋯A1015 | 1 | B0, B5, B10, B15, ⋯B1015 |
| 4 | A1, A6, A11, A16, ⋯A1016 | 5 | B1, B6, B11, B16, ⋯B1016 |
| 8 | A2, A7, A12, A17, ⋯A1017 | 9 | B2, B7, B12, B17, ⋯B1017 |
| 12 | A3, A8, A13, A18, ⋯A1018 | 13 | B3, B8, B13, B18, ⋯B1018 |
| 16 | A4, A9, A14, A19, ⋯A1019 | 17 | B4, B9, B14, B19, ⋯B1019 |
| 20 | F0, F5, F10, F15, ⋯F1015 | 21 | E0, e5, e10, e15, ⋯e1015 |
| 24 | F1, F6, F11, F16, ⋯F1016 | 25 | E1, e6, e11, e16, ⋯e1016 |
| 28 | F2, F7, F12, F17, ⋯F1017 | 29 | E2, e7, e12, e17, ⋯e1017 |
| 32 | F3, F8, F13, F18, ⋯F1018 | 33 | E3, E8, E13, E18, ⋯E1018 |
| 36 | F4, F9, F14, F19, ⋯F1019 | 37 | E4, E9, E14, E19, ⋯E1019 |

| Enc_C | SHUFFLING GROUPS C AND H | Enc_D | SHUFFLING GROUPS D AND G |
|---|---|---|---|
| MBU | | MBU | |
| 2 | H0, h5, h10, h15, ⋯h1015 | 3 | G0, G5, G10, G15, ⋯G1015 |
| 6 | H1, h6, h11, h16, ⋯h1016 | 7 | G1, G6, G11, G16, ⋯G1016 |
| 10 | H2, h7, h12, h17, ⋯h1017 | 11 | G2, G7, G12, G17, ⋯G1017 |
| 14 | H3, H8, H13, H18, ⋯H1018 | 15 | G3, G8, G13, G18, ⋯G1018 |
| 18 | H4, h9, h14, h19, ⋯h1019 | 19 | G4, G9, G14, G19, ⋯G1019 |
| 22 | C0, C5, C10, C15, ⋯C1015 | 23 | D0, D5, D10, D15, ⋯D1015 |
| 26 | C1, C6, C11, C16, ⋯C1016 | 27 | D1, D6, D11, D16, ⋯D1016 |
| 30 | C2, C7, C12, C17, ⋯C1017 | 31 | D2, D7, D12, D17, ⋯D1017 |
| 34 | C3, C8, C13, C18, ⋯C1018 | 35 | D3, D8, D13, D18, ⋯D1018 |
| 38 | C4, C9, C14, C19, ⋯C1019 | 39 | D4, D9, D14, D19, ⋯D1019 |

FIG.17

| | A MBU 0 | A MBU 4 | A MBU 8 | A MBU 12 | A MBU 16 | F MBU 20 | F MBU 24 | F MBU 28 | F MBU 32 | F MBU 36 |
|---|---|---|---|---|---|---|---|---|---|---|
| Enc_A | | | | | | | | | | |

| | B MBU 1 | B MBU 5 | B MBU 9 | B MBU 13 | B MBU 17 | E MBU 21 | E MBU 25 | E MBU 29 | E MBU 33 | E MBU 37 |
|---|---|---|---|---|---|---|---|---|---|---|
| Enc_B | | | | | | | | | | |

| | H MBU 2 | H MBU 6 | H MBU 10 | H MBU 14 | H MBU 18 | C MBU 22 | C MBU 26 | C MBU 30 | C MBU 34 | C MBU 38 |
|---|---|---|---|---|---|---|---|---|---|---|
| Enc_C | | | | | | | | | | |

| | G MBU 3 | G MBU 7 | G MBU 11 | G MBU 15 | G MBU 19 | D MBU 23 | D MBU 27 | D MBU 31 | D MBU 35 | D MBU 39 |
|---|---|---|---|---|---|---|---|---|---|---|
| Enc_D | | | | | | | | | | |

40 MACRO BLOCK UNITS (MBU)

1/60sec

FIG. 18

```
COMPRESSION RATIO 4:1    | 1 MACRO BLOCK = 1 SYNC BLOCK |

COMPRESSION RATIO 2:1    | 1 MACRO BLOCK = 2 SYNC BLOCK |                |
                         |←—— 272 BYTE ——→|←—— 272 BYTE ——→|
                         |←———————— 544 BYTE ————————→|
```

FIG.20

TWELVE TRACKS IN THE FIRST HALF

| A MBU 0 | B MBU 1 | H MBU 2 | G MBU 3 | · · · · · · | A MBU 16 | B MBU 17 | H MBU 18 | G MBU 19 |

TWELVE TRACKS IN THE LAST HALF

| F MBU 20 | E MBU 21 | C MBU 22 | D MBU 23 | · · · · · · | F MBU 36 | E MBU 37 | C MBU 38 | D MBU 39 |

←———————— 20 MACRO BLOCK UNITS (MBU) ————————→
1/60sec

FIG.21

TWELVE TRACKS IN THE FIRST HALF

| A MBU 0 | B MBU 1 | H MBU 2 | G MBU 3 | · · · · · · | A MBU 16 | B MBU 17 | H MBU 18 | G MBU 19 |

TWELVE TRACKS IN THE LAST HALF

| F MBU 20 | E MBU 21 | C MBU 22 | D MBU 23 | · · · · · · | F MBU 36 | E MBU 37 | C MBU 38 | D MBU 39 |

←———————— 20 MACRO BLOCK UNITS (MBU) ————————→
1/120sec

FIG.22

COMPRESSION ENCODER, COMPRESSION-ENCODING METHOD, RECORDER, AND RECORDING METHOD

BACKGROUND OF THE INVENTION

1. Field of the Invention

The present invention relates to a compression encoder and a compression-encoding method by which first and second digital image signals having frame rates different from each other are compressed on the basis of an equal encoding method, and a recorder and a recording method by which digital image signals thus compressed are recorded onto a recording medium.

2. Description of the Related Art

In the past, there have been proposals for a VTR (Video Tape Recorder) capable of reproducing video signals recorded on recording media according to various formats and of further converting the signals into different formats (ref. Jpn. Pat. Appln. Laid-Open Publication No. 2-171090). In this conventional VTR, the operation state can be changed automatically based on the system of video signals to be reproduced and that of video signals to be set. Determination of the recorded television system can be made by measuring the field frequency.

On the other hand, in recent years, practical use of television systems according to digital systems has been promoted, and broadcasting systems have been diversified. Therefore, a multi-format-compatible VTR for broadcasting use which is compatible with plural formats has been proposed. This multi-format-compatible VTR is compatible with progressive scanning in which every frame consists of one field and HD (Hi Definition) system, in addition to NTSC and PAL, as suggested in the Publication No. 2-171090.

A signal processor suggested in Jpn. Pat. Appln. Laid-pen Publication No. 2001-285802 has been proposed as a VTR of the multi-format-compatible type. In this signal processor, operation modes of a system converter which performs P/I conversion (Progressive-scanning/Interlace-scanning conversion) and I/P (Interlace-scanning/Progressive-scanning conversion) conversion can be automatically changed on the basis of reproduction format information recorded on a magnetic tape and output format information instructed in advance, in order to record/reproduce both of 480I (480 lines and interlace scanning) and 480P (480 lines and progressive scanning).

Also in this signal processor, displacement of the barycenter between first and second fields forming one frame can be eliminated by performing a vertical filtering processing on video signals to be outputted, when reproduction at a changed speed such as ½-speed reproduction in which the tape speed of reproduction is half the speed of recording is performed, for example, in the format of 480I.

However, in the conventional signal processor, suppose a case that recording is performed in a different format for every frame rate (30 and 60 frames/second) in the 4:2:2 format which is based on four luminance blocks and two color difference signal blocks for each of Cb and Cr. In this case, if the frame rate of 60 frames/second is subjected to ½-speed reproduction as described above, an interpolation processing is required and the resolution hence deteriorates. Also, in the conventional signal processor described above, decoders need to be developed respectively for the different formats, in order to achieve an optimal reproduction operation for each format. There has been a problem that the development period is prolonged in addition to increase in development costs of the whole signal processor.

Also in the 4:2:2 format, reproduction processing can be executed by one single decoder if recording has been carried out in the format at the frame rate of 30 frames/second. However, if recording has been carried out in the other format at the frame rate of 60 frames/second, two decoders are required. The format at 60 frames/second can be equivalent to the format at 30 frames/second in reproduction by executing the ½-speed reproduction as described above. However, shuffling methods for rearranging macro blocks in accordance with formats are different between both of the formats. Therefore, two decoders are finally required for reproduction, resulting in a problem that labor saving in developments and speed-up of reproduction processings cannot progress. Note that the same problem occurs in other encoding systems such as a 4:4:4 format and the like.

SUMMARY OF THE INVENTION

The present invention hence has been proposed in view of the problems above and relates to a compression encoder and a compression-encoding method by which first and second digital image signals having different frame rates from each other are compressed into different formats, respectively, depending on the frame rates, according to one same encoding system, and a recorder and a recording method by which the compressed digital image signals are recorded onto a recording medium.

An object of the present invention is to provide a compression encoder, a compression-encoding method, a recorder, and a recording method by which the number of decoders necessary for ½-speed reproduction of the first digital signal can be reduced by improving a method of shuffling the first digital image signal, and deterioration of resolution can be restricted without necessitating an interpolation processing.

According to an aspect of the present invention, there is provided a compression encoder which compresses first and second digital image signals having frame rates different from each other, based on a same encoding system, comprising: a dividing section which divides the inputted digital image signals into plural macro blocks of orthogonal transformation blocks; a shuffling section which rearranges the macro blocks divided by the dividing section; and a compression-encoding section which compression-encodes the digital image signals every macro block unit consisting of plural macro blocks rearranged by the shuffling section, wherein the shuffling section rearranges the macro blocks of the first digital image signals, based on a method of rearranging the macro blocks of the second digital image signals.

According to another aspect of the present invention, there is provided a compression-encoding method of compressing first and second digital image signals having frame rates different from each other, based on a same encoding system, comprising: a dividing step of dividing the inputted digital image signals into plural macro blocks of orthogonal-transformation blocks; a shuffling step of rearranging the macro blocks divided by the dividing step; and a compression-encoding step of compression-encoding the digital image signals every macro block unit consisting of plural macro blocks rearranged by the shuffling step, wherein in the shuffling step, the macro blocks of the first digital image signals are rearranged, based on a method of rearranging the macro blocks of the second digital image signals.

The compression encoder and compression-encoding method are designed to compress the first digital image signals and the second digital image signals having a different frame rate from that of the first digital image signals, based on one same encoding system. Based on the method of rearranging the macro blocks of the second digital image signals, the macro blocks of the first digital image signals are rearranged, so that the respective digital image signals compression-encoded and outputted can have macro block layouts equivalent to each other.

According to further another aspect of the present invention, there is provided a recorder which compresses first and second digital image signals having frame rates different from each other, based on a same encoding system, and records the digital image signals compressed, onto a recording medium, comprising: a dividing section which divides the inputted digital image signals into plural macro blocks of orthogonal-transformation blocks; a shuffling section which rearranges the macro blocks divided by the dividing section, in units of macro block units each including plural macro blocks; a compression-encoding section which compression-encodes the digital image signals every macro block unit consisting of plural macro blocks rearranged by the shuffling section; and a recording section which records the digital image signals compression-encoded by the compression-encoding section, assigning the digital image signals to tracks of the recording medium, for every macro block unit, wherein the shuffling section rearranges the macro blocks of the first digital image signals based on a method of rearranging the macro blocks of the second digital image signals.

According to further another aspect of the present invention, there is provided a recording method of compressing first and second digital image signals having frame rates different from each other, based on a same encoding system, and recording the digital image signals compressed, onto a recording medium, comprising: a dividing step of dividing the inputted digital image signals into plural macro blocks of orthogonal-transformation blocks; a shuffling step of rearranging the macro blocks divided by the dividing step, in units of macro block units each including plural macro blocks; a compression-encoding step of compression-encoding the digital image signals every macro block unit consisting of plural macro blocks rearranged by the shuffling step; and a recording step of recording the digital image signals compression-encoded by the compression-encoding step, assigning the digital image signals to tracks of the recording medium, for every macro block unit, wherein in the shuffling step, the macro blocks of the first digital image signals are rearranged, based on a method of rearranging the macro blocks of the second digital image signals.

The recorder and recording method are designed to compress the first digital image signals and the second digital image signals having a different frame rate from that of the first digital image signals, based on one same encoding system, and record the compressed digital image signals onto a recording medium. Based on the method of rearranging the macro blocks of the second digital image signals, the macro blocks of the first digital image signals are rearranged, so that the respective digital image signals compression-encoded and outputted can have macro block layouts equivalent to each other and can be recorded.

According to further another aspect of the present invention, there is provided a compression encoder which compresses first and second digital image signals having frame rates different from each other, based on a same encoding system, comprising: a dividing section which divides the first digital image signals into plural macro blocks as well as the second digital image signals into plural macro blocks; a shuffling section which rearranges the plural macro blocks of the second digital image signals divided by the dividing section, based on a layout of the plural macro blocks of the first digital image signals divided by the dividing section, into a layout of macro blocks which is equivalent to that of the first digital image signals; and a compression-encoding section which compression-encodes the digital image signals every macro block unit consisting of plural macro blocks rearranged by the shuffling section.

According to further another aspect of the present invention, there is provided a compression-encoding method of compressing first and second digital image signals having frame rates different from each other, based on a same encoding system, comprising: a dividing step of dividing the first digital image signals into plural macro blocks as well as the second digital image signals into plural macro blocks; a shuffling step of rearranging the plural macro blocks of the second digital image signals divided by the dividing step, based on a layout of the plural macro blocks of the first digital image signals divided by the dividing step, into a layout of macro blocks which is equivalent to that of the first digital image signals; and a compression-encoding step of compression-encoding the digital image signals every macro block unit consisting of plural macro blocks rearranged by the shuffling step.

According to further another aspect of the present invention, there is provided a recorder which compresses first and second digital image signals having frame rates different from each other, based on a same encoding system, and records the digital image signals compressed, onto a recording medium, comprising: a dividing section which divides the first digital image signals into plural macro blocks as well as the second digital image signals into plural macro blocks; a shuffling section which rearranges the plural macro blocks of the second digital image signals divided by the dividing section, in units of macro block units each including plural macro blocks, based on a layout of the plural macro blocks of the first digital image signals divided by the dividing section, into a layout of macro blocks which is equivalent to that of the first digital image signals; a compression-encoding section which compression-encodes the digital image signals every macro block unit consisting of plural macro blocks rearranged by the shuffling section; and a recording section which records the digital image signals, assigning the digital image signals to tracks of the recording medium, for every macro block unit.

According to further another aspect of the present invention, there is provided a recording method of compressing first and second digital image signals having frame rates different from each other, based on a same encoding system, and recording the digital image signals compressed, onto a recording medium, comprising: a dividing step of dividing the first digital image signals into plural macro blocks as well as the second digital image signals into plural macro blocks; a shuffling step of rearranging the plural macro blocks of the second digital image signals divided by the dividing step, in units of macro block units each including plural macro blocks, based on a layout of the plural macro blocks of the first digital image signals divided by the dividing step, into a layout of macro blocks which is equivalent to that of the first digital image signals; a compression-encoding step of compression-encoding the digital image signals every macro block unit consisting of plural macro blocks rearranged by the shuffling step; and a recording step of recording the digital image signals, assigning the digital image signals to tracks of the recording medium, for every macro block unit.

As has been described above, in the compression encoder and compression-encoding method according to the present invention, the first digital image signals and the second digital image signals having a different frame rate from that of the first digital image signals are compressed on the basis of one same encoding system. Based on the method of rearranging the macro blocks of the second digital image signals, the first digital image signals are rearranged, so that the respective digital image signals compression-encoded and outputted can have macro block layouts equivalent to each other.

As a result of this, the compression encoder and compression-encoding method are capable of compression-encoding data so that deterioration in resolution can be restricted when the first digital image signals recorded on a recording medium is subjected to ½-speed reproduction and the number of decoders can be reduced.

Also, as has been described above, in the recorder and recording method according to the present invention, the first digital image signals and the second digital image signals having a different frame rate from that of the first digital image signals are compressed on the basis of one same encoding system, and the compressed digital image signals are recorded onto a recording medium. Based on the method of rearranging the macro blocks of the second digital image signals, the macro blocks of the first digital image signals are rearranged, so that the respective digital image signals compression-encoded and outputted can have macro block layouts equivalent to each other and can be recorded.

As a result of this, the recorder and recording method are capable of compression-encoding and recording data so that deterioration in resolution can be restricted when the first digital image signals recorded on a recording medium is subjected to ½-speed reproduction and the number of decoders can be reduced.

BRIEF DESCRIPTION OF THE DRAWINGS

FIGS. 2A and 2B are tables for explaining the bit rate at each frame rate according to a 4:2:2 format and the number of decoders necessary for normal reproduction;

FIG. 4 is a table which shows an example of macro blocks of second digital image signals 422 (30P) assigned to respective MBUs;

FIG. 8 is a table which shows an example of macro blocks of the first digital image signals 422 (60P) assigned to respective MBUs;

FIG. 11 is a table for explaining a method of dividing macro blocks according to a 4:4:4 format;

FIGS. 12A and 12B are tables which show a case of rearranging respective shuffling groups of second digital image signals 444 (30P);

FIG. 13 is a diagram showing an example of macro blocks of the second digital image signals 444 (30P) assigned to respective MBUs;

FIG. 17 is a table which shows an example of macro blocks of the first digital image signals 444 (60P) assigned to respective MBUs;

FIG. 18 is a diagram showing MPEG streams of the second digital image signals 444 (30P);

FIG. 20 is a diagram for explaining a case where one macro blocks is constituted by one sync block (272 byte) by setting the compression ratio to 4:1 in the 4:4:4 format;

FIG. 21 is a diagram which shows an MPEG stream in a case where the second digital image signals 444 (30P) are set to 4:1; and FIG. 22 is a diagram which shows an MPEG stream in a case where the first digital image signals 444 (60P) is set to 4:1.

DETAILED DESCRIPTION OF THE INVENTION

Hereinafter, embodiments of the present invention will be described in details with reference to the drawings.

Figure 1:
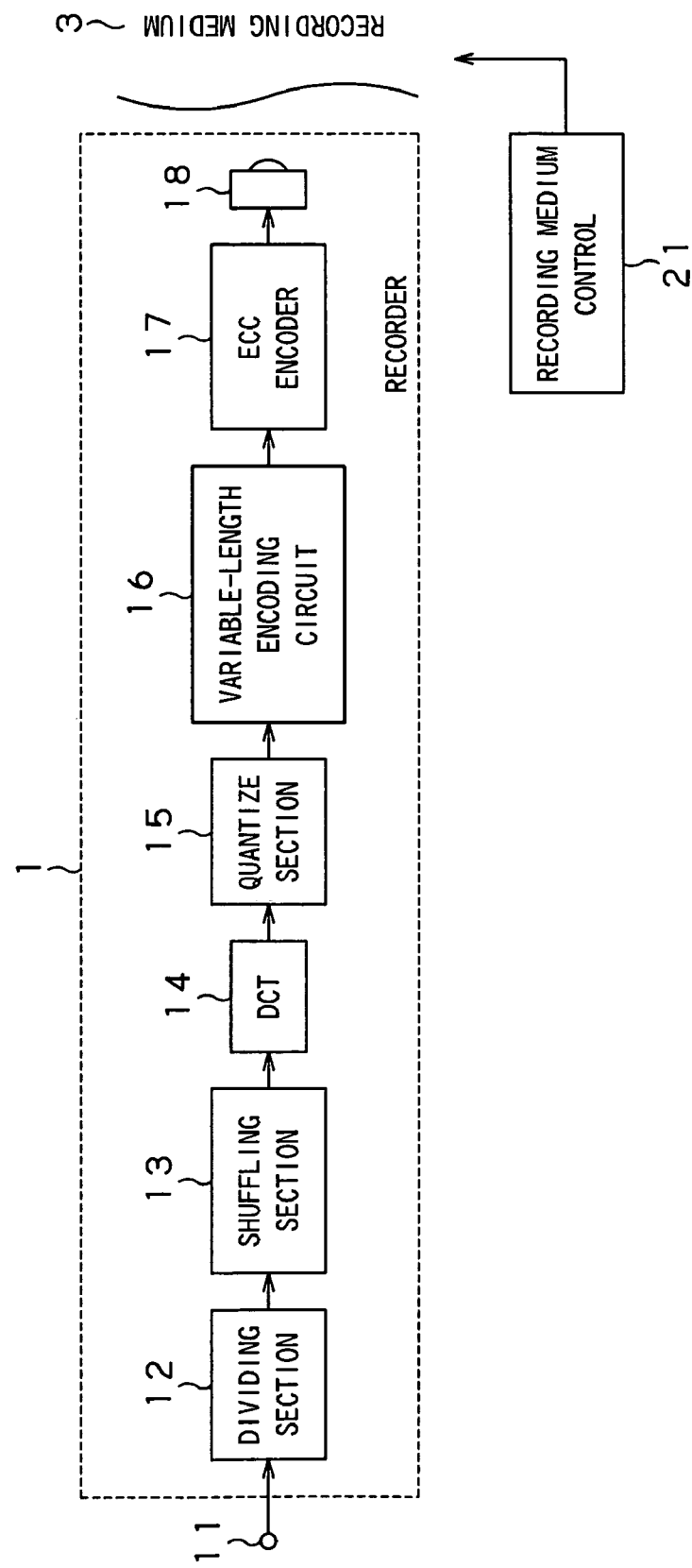
FIG. 1 is a block diagram of a recorder to which the present invention is applied.

The present invention is applied to a recorder 1, for example, as shown in FIG. 1. The recorder 1 shuffles inputted digital image signals in units of micro blocks and subjects the signals to DCT (Discrete Cosine Transform) conversion. Besides, the recorder 1 then quantizes the signals. Irreversible image compression is thus achieved, and the compressed signals are recorded onto a recording medium 3.

The recorder 1 has an input terminal 11, a dividing section 12, a shuffling section 13, DCT (Discrete Cosine Transform) circuit 14, a quantize circuit 15, a variable-length encoding circuit 16, an ECC encoder 17, a recording section 18, and a recording medium control section 21. The input terminal 11 is inputted with luminance signals Y, color difference signals Cb and Cr, and digital image signals of R, G, and B. The dividing section 12 divides the inputted image signals of 1 frame into macro blocks of plural orthogonal transformation blocks. The shuffling section 13 rearranges the macro blocks divided by the dividing section 12. The DCT circuit 14 effects discrete cosine transformation (DCT) on each of the digital image signals in units of macro blocks which are inputted from the shuffling section 13. The quantize circuit 15 quantizes DCT coefficients inputted from the DCT circuit 14, by quantize steps. The variable-length encoding circuit 16 performs a variable-length encoding processing on the digital image signals outputted from the quantize circuit 15. The ECC encoder 17 performs ECC-encoding (Error Correction Code encoding) on MPEG video streams outputted from the variable-length encoding circuit 16. The recording section 18 records the digital image signals outputted from the ECC encoder 17, onto a recording medium 3. The recording medium control section 21 serves to control operations of the recording medium 3.

The recording medium 3 is a magnetic tape, a magnetic disk, or the like on which digital image signals are recorded by the recording section 18. The following description will be made of a case where a magnetic tape is used as the recording medium 3. Helical tracks on which digital image signals are actually recorded are provided in the recording medium 3.

Digital image signals are recorded in units of macro blocks, on each of the tracks arranged in the recording medium 3.

The input terminal 11 is inputted with digital image signals in units of frames. The inputted digital image signals have been rearranged in the order in which the signals should be encoded, with respect to the frame order arranged in accordance with display time. The digital image signals supplied to the input terminal 11 are transmitted in units of frames to the dividing section 12.

The image signals thus inputted through the input terminal 11 may correspond to various encoding systems such as a 4:2:2 format which is based on four luminance blocks and two color difference signal blocks for each of Cb and Cr, a 4:4:4 format which is based on luminance blocks, color difference signal blocks, or any of R, G, and B, etc. Also, the image signals inputted through the input terminal 11 consists of signals having various frame rates, such as digital image signals at 60 or 59.94 frames/second, digital image signals at 30 or 29.97 frames/second, etc. Further, the digital image signals inputted through the input terminal 11 include digital image signals according to an interlace format or a progressive format. That is, the recorder 1 compression-encodes and records every digital image signal of various formats, and the recorder 1 is a so-called multi-format-compatible type.

The dividing section 12 separates the digital image signals received from the input terminal 11, into macro blocks each consisting of 16×16 pixels, for every frame, i.e., macro-blocking. The digital image signals thus divided into macro blocks are transmitted to the shuffling section 13.

The shuffling section 13 creates shuffling groups each consisting of plural macro blocks divided by the dividing section 12 and discretely existing in a frame. The shuffling section 13 rearranges the macro blocks in units of created shuffling groups. The method of rearranging the macro blocks in the shuffling section 13 win be described in details later.

The DCT circuit 14 performs cosine transform processing which is a kind of orthogonal conversion, on the digital image signals in units of macro blocks which are inputted from the shuffling section 13, to convert the digital image signals in a special domain into DCT coefficients in a frequency domain. That is, the DCT circuit 14 performs the cosine transform processing in units of macro blocks, to generate the DCT coefficients (16×16), and outputs the coefficients to the quantize circuit 15.

The quantize circuit 15 divides the DCT coefficients by integers called quantize steps, to achieve quantization. Specifically, the quantize circuit 15 selects a quantize table in which the bit number after quantization is maximized within a range in which the bit number after quantization does not exceeds a target bit number, and then, the quantize circuit 15 performs quantization. In the quantize table, the steps are defined such that quantization becomes coarser toward the higher band side in both of the vertical and horizontal directions. Further, the quantize circuit 15 performs zigzag scanning or alternate scanning on the DCT coefficients in a direction to higher band components from data of direct current components, to take the coefficients as a one-dimensional data stream. Quantized data are sent to the variable-length encoding circuit 16.

The variable-length encoding circuit 16 performs variable-length encoding on the quantized digital image signals (DCT coefficients), to encode the data into sets each consisting of a run-length of coefficient 0 and non-0 coefficients subsequent thereto. By thus performing variable-length encoding, it is possible to reduce the data amount of high band components which include many zeros increased. Further, the variable-length encoding circuit 16 is inputted with reference direction information, frame/field estimation mode information, motion vectors, and various MPEG system data, together with the digital image signals (DCT coefficients). The variable-length encoding circuit 16 multi-layers these data in accordance with an MPEG format and generates an MPEG video stream. The generated MPEG video stream is transmitted to the ECC encoder 17.

The ECC encoder 17 adds ECC to the MPEG video stream supplied from the variable-length encoding circuit 16 and performs an interleave processing and the like. In case where digital image signals are recorded in unit of macro blocks onto the tracks of the recording medium 3, for example, the ECC encoder 17 takes a sync-block for every twelve tracks, as an ECC interleave unit in the ECC encoder 17. In this case, the ECC encoder 17 interleaves and assigns the sync-block for every twelve tracks, to an ECC plane. Further, the ECC encoder 17 has a unique ECC bank memory not shown and makes this memory temporarily store the MPEG stream to be recorded onto the recording medium 3.

If the recording medium 3 is a magnetic tape, the recording section 18 is constructed by a magnetic head and the like, which slide obliquely over the magnetic tape rotated by a rotation drum not shown. The recording section 18 sequentially records the digital image signals supplied from the connected ECC encoder 17 onto the magnetic tape.

The recording medium control section 21 is a device for controlling the driving state of the recording medium 3, and corresponds to, for example, a servo control if the recording medium 3 is thus a magnetic tape. The recording medium control section 21 can control the recording medium 3 such that various data is recorded at a normal 1×-speed. If the recorder 1 is provided with a reproduction function, it is possible to control freely the driving state of the recording medium 3 even in case of reproducing data at speeds of $\frac{1}{2}$, $\frac{1}{4}$, . . . times the normal 1×-speed or frame by frame, i.e., in case of so-called variable-speed reproduction.

In the present recorder 1, it is possible to multiply the above-described structure which starts form the DCT circuit 14 up to the variable-length encoding circuit 16. In this case, the compression encoding can be simultaneously performed by plural chips, respectively corresponding to the formats of inputted digital image signals.

Next, a description will be made of the method of rearranging macro blocks in the shuffling section 13 forming part of the recorder 1 to which the present invention is applied.

Explained first will be a case of recording inputted digital image signals in different formats respectively for different frame rates (30 and 60 frames/second), based on the 4:2:2 format.

FIG. 2A shows the bit rates and the number of decoders necessary for normal reproduction at the frame rates according to the 4:2:2 format, respectively. The digital image signals having the frame rate of 60 frames/second are referred to as first digital image signals 422 (60P), and the other digital image signals having the frame rate of 30 frames/second which is the half of that of the first digital image signals 422 are referred to as second digital image signals 422 (30P).

At this time, if horizontal pixels×vertical pixels are 1920×1080, the first digital image signals 422 (60P) have a bit rate of 900 Mbps and requires two decoders for reproduction. In contrast, the second digital image signals 422 (30P) has a bit rate of 450 Mbps and can be reproduced by one decoder. Note that if horizontal pixels×vertical pixels are 1280×720, the first digital image signals 422 (60P) is not compatible but the second digital image signals 422 (30P) can be reproduced by one decoder.

The shuffling section 13 forming part of the recorder 1 to which the present invention is applied shuffles the inputted first digital image signals 422 (60P) so as to have a macro block structure equivalent to that of the second digital image signals 422 (30P). In other words, the shuffling section 13 rearranges the first digital image signals 422 (60P), based on the method of rearranging macro blocks of the second digital image signals 422 (30P).

The method of rearranging the second digital image signals 422 (30P) which should be referred to when macro blocks of the first digital image signals 422 (60P) are rearranged will be as follows.

Figure 3:
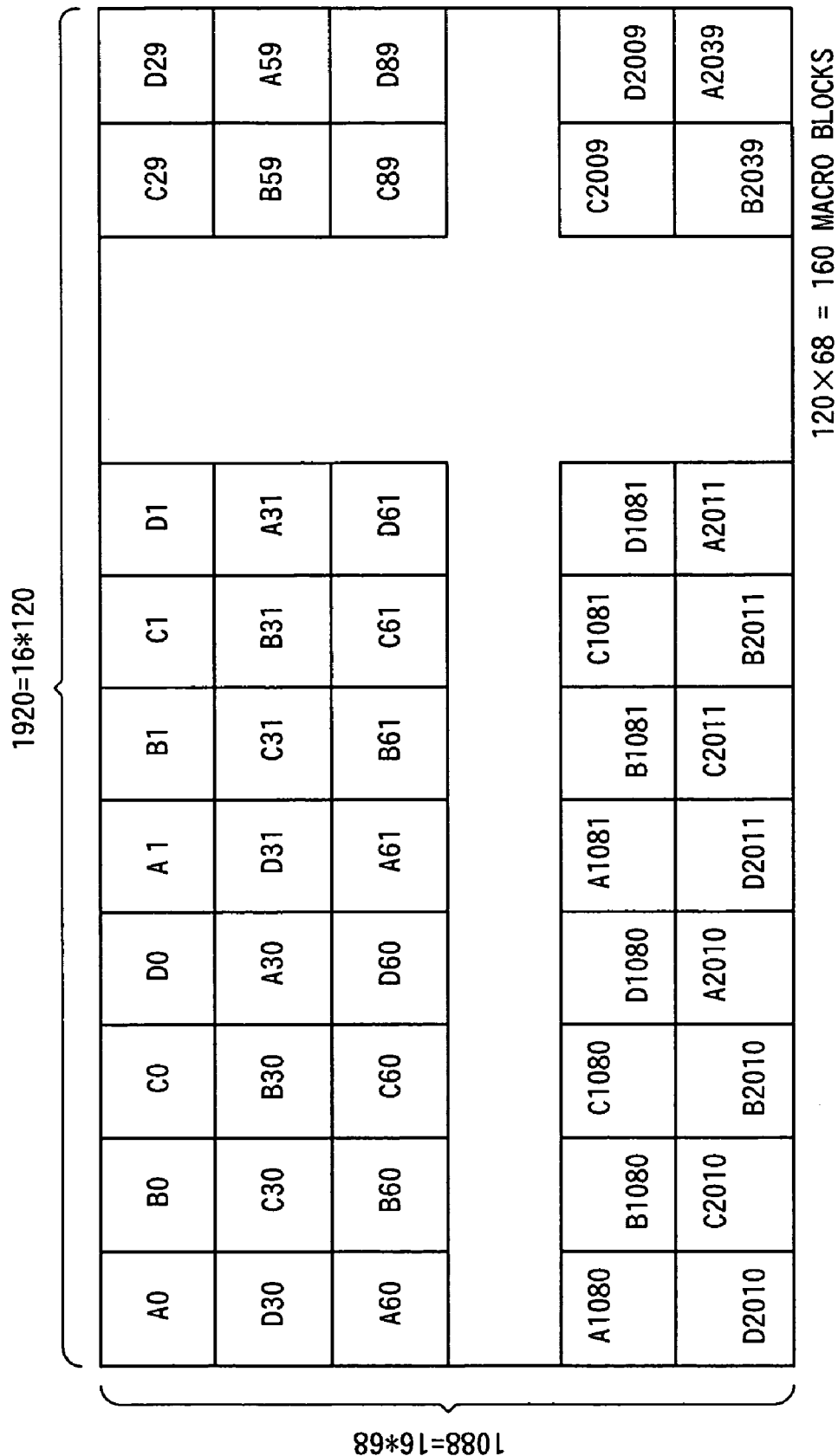
FIG. 3 is a table for explaining a method of dividing macro blocks according to the 4:2:2 format.

That is, as shown in FIG. 3, the dividing section 12 divides the second digital image signals 422 (30P) inputted from the input terminal 11 in units of frames (1920×1080 pixels), at 1 frame per 1/30 second, into macro blocks each consisting of 16×16 pixels. The number of macro blocks forming one frame is 120×68=8160.

The shuffling section 13 groups the macro blocks divided by the dividing section 12 and discretely existing in a frame, into four shuffling groups A, B, C, and D. Suppose that block Nos. are assigned to 120 macro blocks positioning in the uppermost line, in the order from A to D in the horizontal direction from the left upper block, e.g., A0, B0, C0, D0, A1, B1, C1, D1, ..., C29, D29. At this time, thirty macro blocks are grouped into each of shuffling groups A to D, e.g., A0 to A29 are assigned to the shuffling group A, B0 to B29 to the shuffling group B, C0 to C29 to the shuffling group C, as well as D0 to D29 to the shuffling group D.

In the second line from the upper side, block Nos. are assigned in the order from D to A, e.g., D30, C30, B30, A30, D31, ..., A59. At this time, macro blocks A30 to A59, B30 to B59, C30 to C59, and D30 to D59 are respectively assigned to the shuffling groups A, B, C, and D. Likewise, in the third line from the upper side, block Nos. are assigned in the order from A to D, e.g., A60, B60, C60, D60, A61, ..., D89, and thus, the macro blocks are assigned to the shuffling groups A, B, C, and D. In the lowermost line, block Nos. are assigned in the horizontal direction from the left lower block, e.g., D2010, C2010, B2010, A2010, ..., A2039.

In the odd-numbered lines from the upper side, the block Nos. are assigned in the order from A to D. In the even-numbered lines, the block Nos. are assigned in the order from D to A. Thus, each of the shuffling groups A, B, C, and D is constituted by 8160/4=2040 macro blocks which exist discretely in a frame.

The above-described grouping method using the shuffling groups A, B, C, and D is merely an example, so that grouping can be carried out in any other method.

Next, the shuffling section 13 creates a macro block unit (hereinafter referred to as MBU) consisting of 204 macro blocks, for every one of the shuffling groups A, B, C, and D. The MBU is a unit used when digital image signals are recorded onto the recording medium 3. That is, 2040/204=10 MBUs can be assigned to each shuffling groups A, B, C, and D, and every one frame can be constituted by 8160/204=40 MBUs.

FIG. 4 shows examples of macro blocks assigned to each MBU. In FIG. 4, where the numbers for identifying MBUs are orderly MBU 0, MBU 1, MBU 2, ..., MBU 38, MBU 39, the macro blocks A0, A1, A2, ..., A2039 which belong to the shuffling group A are assigned to any of the MBU 0, MBU 2, MBU 4, MBU 6, ..., MBU 18. Also, the macro blocks B0, B1, B2, ..., B2039 which belong to the shuffling group B are assigned to any of MBU 1, MBU 3, MBU 5, MBU 7, ..., MBU 19. Also, the macro blocks C0, C1, C2, ..., C2039 which belong to the shuffling group C are assigned to any of MBU 20, MBU 22, MBU 24, MBU 26, ..., MBU 38. Further, the macro blocks D0, D1, D2, ..., D2039 which belong to the shuffling group D are assigned to any of MBU 21, MBU 23, MBU 25, MBU 27, ..., MBU 39.

That is, the macro blocks which belong to the shuffling groups A and B are assigned to MBU 0 to MBU 19, and the macro blocks which belong to the shuffling groups C and D are assigned to MBU 20 to MBU 39.

To the MBU 0 assigned with the macro blocks of the shuffling group A, for example, macro blocks A0, A10, A20, A30, ..., A2030 of every tenth block No. are assigned. Similarly, A1, A11, A21, A31, ..., A2031 of every tenth block No. are assigned to the MBU 2. Also similarly, to the MBU 1 assigned with the macro blocks of the shuffling group B, for example, macro blocks B0, B10, B20, B30, ..., B2030 of every tenth block No. are assigned. Also similarly, B1, B11, B21, B31, ..., B2031 are assigned to the MBU 3. To each of the other MBUs 4 to 19, macro blocks of every tenth block No. are assigned.

With respect to each of MBUs 20 to 39 of the other shuffling groups C and D, macro blocks of every tenth block No. are also assigned as shown in FIG. 4.

The MBUs can be constituted by only the macro blocks which are not adjacent to each other but discretely exist in a frame, by extracting a macro block for every tenth block No.

Figure 5:
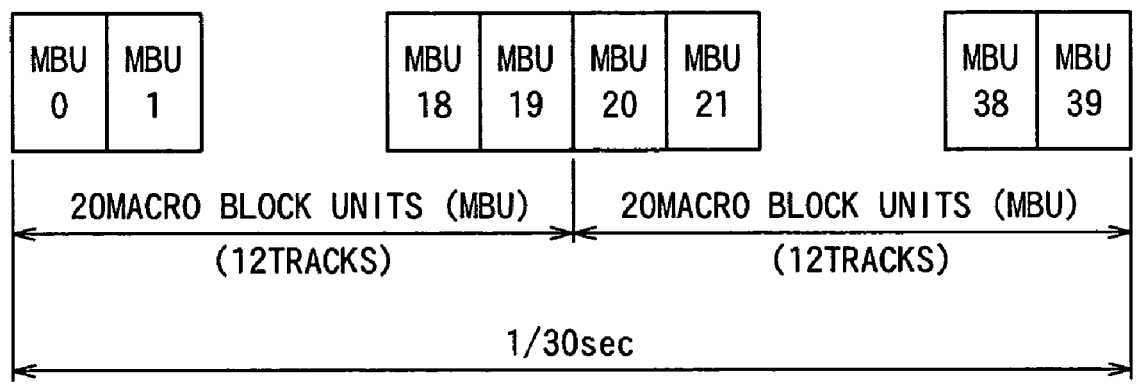
FIG. 5 is a diagram showing an MPEG stream of the second digital image signals 422 (30P)

After the macro blocks are rearranged as described above by the shuffling section 13, the digital image signals are encoded by the variable-length encoding circuit 16. These digital image signals are subjected to an interleave processing by the ECC encoder 17 such that twenty MBUs of MBU 0 to 19 are recorded on twelve tracks in the first half of the recording medium 3 and other twenty MBUs of MBU 20 to 39 are recorded on twelve tracks in the last half of the recording medium 3. As a result of this, as shown in FIG. 5, the MPEG stream outputted from the ECC encoder 17 is outputted in the order starting from the MBU 0 to MBU 1, MBU 2, ..., MBU 18, MBU 19, in accordance with the order in which the stream is recorded on the twelve tracks in the first half of the recording medium 3. Thereafter, the MPEG stream is outputted in the order starting from the MBU 20 to MBU 21, MBU 22, ..., MBU 38, MBU 39, in accordance with the order in which the stream is recorded on the twelve tracks in the last half of the recording medium 3. Note that the time required until the forty MBUs 0 to 39 are outputted is 1/30 second equivalent to one frame.

The digital image signals are recorded in units of MBUs onto the first twenty tracks or last twenty tracks of the recording medium 3. Each MBU is constituted by only the macro blocks which discretely exist in a frame. Therefore, even if the digital image signals are lost in units of MBUs, only those pixel areas that form the macro blocks discretely existing in a frame are lost but sequential macro blocks adjacent to each other in a frame are not lost. It is hence possible to specify easily luminance signals with respect to the pixel areas of the lost macro blocks, based on pixels forming other macro blocks adjacent to the lost macro blocks.

Figure 6A:
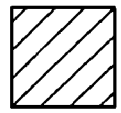
FIGS. 6A and 6B are diagrams showing layouts of macro blocks remaining in case where all the twelve tracks in the first or last half of a recording medium are lost.

In this rearranging method, MBUs 0 to 19 constituting the shuffling groups A and B are assigned to the first twelve tracks of the recording medium 3, and MBUs 20 to 39 constituting the shuffling groups C and D are assigned to the last twelve tracks. Therefore, even if all the first twelve tracks are lost from the recording medium, only the macro blocks constituting the shuffling groups A and B are all lost, as shown in FIG. 6A, but the shuffling groups C and D remain. Accordingly, with respect to the pixel areas of the lost macro blocks constituting the shuffling groups A and B, luminance signals can be easily specified based on the pixels forming the macro blocks of adjacent shuffling groups C and D.

Figure 6B:
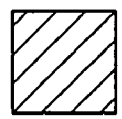

Likewise, even if all the last twelve tracks are lost from the recording medium, only the macro blocks constituting the shuffling groups C and D are all lost, as shown in FIG. 6B, but the shuffling groups A and B remain. Accordingly, with respect to the pixel areas of the macro blocks constituting the lost shuffling groups C and D, luminance signals can be easily specified based on the pixels forming the macro blocks of adjacent shuffling groups A and B.

That is, the order of macro blocks is rearranged with respect to the second digital image signals 422 (30P), as described above. As a result of this, even if the digital image signals are lost in units of MBUs during recording or reproduction, only the macro blocks which discretely exist are lost, and lost pixel areas can be easily compensated for based on other adjacent macro blocks. Note that the method of rearranging the macro blocks of the second digital image signals 422 (30P) is not limited to the method described above. For example, the shuffling groups A and C may be assigned to the MBUs 0 to 19, and the shuffling groups B and D may be assigned to MBUs 20 to 39. In this manner, when twelve blocks are sequentially lost, the obliquely hatched areas indicating the lost macro blocks may form a checkered pattern as shown in FIGS. 6A and 6B. As a result of this, the pixel areas forming the lost macro blocks can be compensated for with much higher accuracy.

The shuffling section 13 rearranges inputted first digital image signals 422 (60P) in a manner described below, in accordance with the above-described method of rearranging macro blocks of the second digital image signals 422 (30P).

Specifically, the dividing section 12 divides the first digital image signals 422 (60P) inputted in units of frames (1920× 1080 pixels) at 1 frame per 1/60 second, into macro blocks each consisting of 16×16 pixels. The dividing method in the dividing section 12 is the same as that of the method of dividing the second digital image signals 422 (30P) into macro blocks, and the signals can be divided into 120×68=8160 macro blocks for every frame.

The shuffling section 13 assigns macro blocks divided by the dividing section 12 and discretely existing in a frame, into four shuffling groups A, B, C, and D. The method of assigning the macro blocks to the shuffling groups is the same as that in the foregoing case of the second digital image signals 422 (30P). Therefore, a detailed description of the method is omitted herefrom by referring to the foregoing description with reference to FIG. 3.

The first digital image signals 422 (60P) are compression-encoded with use of two variable-length encoding circuits 16 (the two variable-length encoding circuits will be hereinafter referred to as Enc_A and Enc_B). Therefore, the shuffling section 13 assigns the shuffling groups A and C among the four shuffling groups A, B, C, and D to the Enc_A side, as well as the shuffling groups B and D to the Enc_B side.

Figures 7A, 7B:
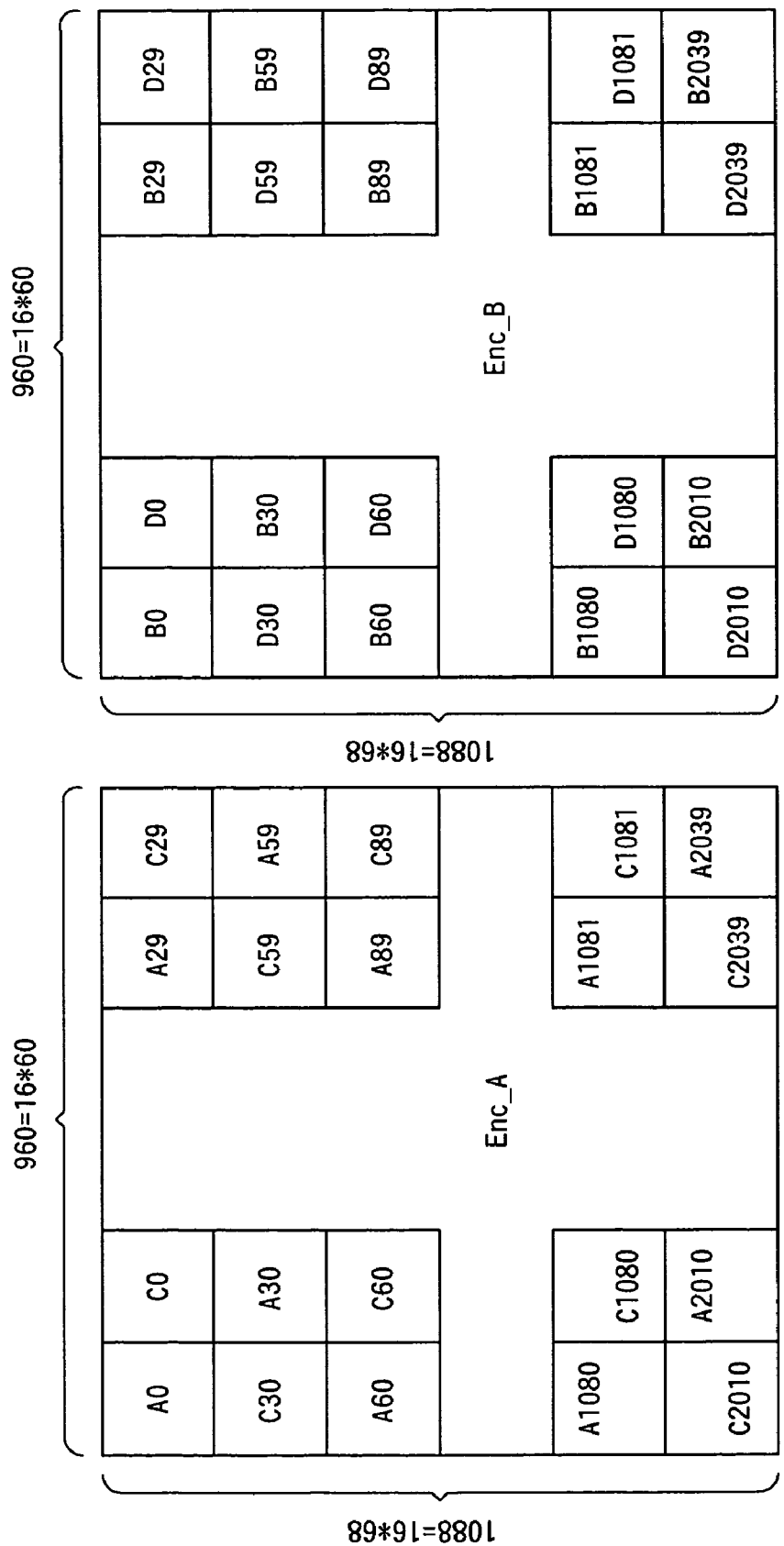
FIGS. 7A and 7B are diagrams showing a case where respective shuffling groups of first digital image signals 422 (60P) are rearranged.

FIG. 7A shows a case where the shuffling groups A and C are rearranged in order to perform encoding in the Enc_A. As shown in FIG. 7A, the digital image signals encoded by the Enc_A are constituted by 60×68=4080 macro blocks. The digital image signals encoded by the Enc_B are constituted by 60×68=4080 macro blocks, too, as shown in FIG. 7B.

The shuffling section 13 rearranges the macro blocks which belong to the shuffling groups A and C to be encoded by the Enc_A, in the order from A to C in the horizontal direction from the left upper side as shown in FIG. 7A, e.g., in the order of A0, C, A1, C, A2, ..., A29, C29. In the second line from the upper side, the macro blocks are sequentially rearranged in the order from C to A, e.g., in the order of C30, A30, C31, ..., C59, A59. In the lowermost line, the macro blocks are sequentially rearranged in the horizontal direction from the left side, e.g., in the order of C2010, A2010, C2011, A2011, ..., A2039.

Thus, the shuffling section 13 rearranges the macro blocks in the order from A to C, in the odd-numbered lines from the upper side. In the even-numbered lines from the upper side, the shuffling section 13 rearranges the macro blocks in the order from C to A. In other words, the shuffling section 13 rearranges the macro blocks such that the macro blocks constituting the shuffling groups B and D are suppressed from the macro blocks shown in FIG. 3.

Similarly, the macro blocks which belong to the shuffling groups B and D to be encoded by the Enc_B are rearranged in the order from B to D in the horizontal direction from the left upper side as shown in FIG. 7B, e.g., in the order of B0, D0, B1, D1, ..., B29, D29. In the second line from the upper side, the macro blocks are sequentially rearranged in the order from D to B, e.g., in the order of D30, B30, D31, B31, ..., D59, B59. Thus, the shuffling section 13 rearranges the macro blocks in the order from B to D, in the odd-numbered lines from the upper side. In the even-numbered lines from the upper side, the shuffling section 13 rearranges the macro blocks in the order from D to B. In other words, the shuffling section 13 rearranges the macro blocks such that the macro blocks constituting the shuffling groups A and C are suppressed from the macro blocks shown in FIG. 3.

Next, as shown in FIG. 8, the shuffling section 13 creates MBUs each consisting of 204 macro blocks, for every one of the shuffling groups A, B, C, and D. The macro blocks assigned to each MBU are the same as those in the foregoing case of the second digital image signals 422 (30 frames (Progressive-scanning)), and therefore, a detailed description thereof is omitted herefrom. In FIG. 8, MBUs 0, 2, 4, 6, ..., 36, 38 which belong to the shuffling groups A and C to be encoded by the Enc_A are listed in the left side, while MBUs 1, 3, 5, 7, ..., 37, 39 which belong to the shuffling groups B and D to be encoded by the Enc_B are listed in the right side.

Figure 9A:
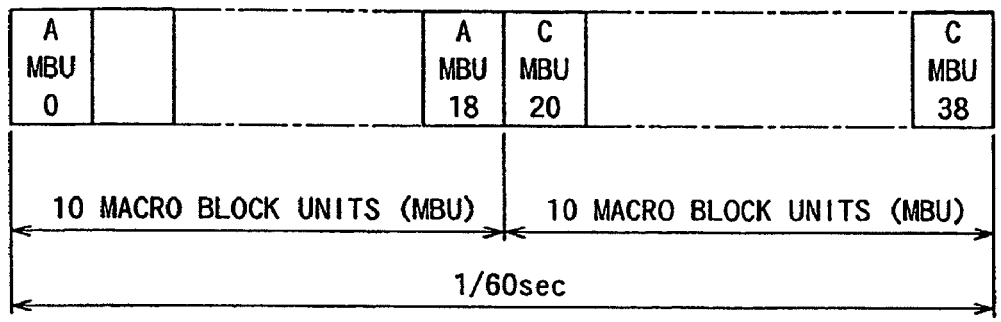
FIGS. 9A and 9B are diagrams showing MPEG streams of the first digital image signals 422 (60P)

After the macro blocks are rearranged by the shuffling section 13, the digital image signals are encoded by the Enc_A and Enc_B as the variable-length encoding circuits 16. As a result, as shown in FIG. 9A, the first ten MBUs of the MPEG stream outputted from the Enc_A are outputted in the order of MBU 0, MBU 2, MBU 4, ..., MBU 18 to which the macro blocks of the shuffling group A are assigned. The MBUs to be outputted next are outputted in the order of MBU 20, MBU 22, MBU 24, ..., MBU 38 to which the macro blocks of the shuffling group C are assigned. Note that the time required until the twenty MBUs 0 to 38 are outputted is 1/60 second equivalent to one frame.

Figure 9B:
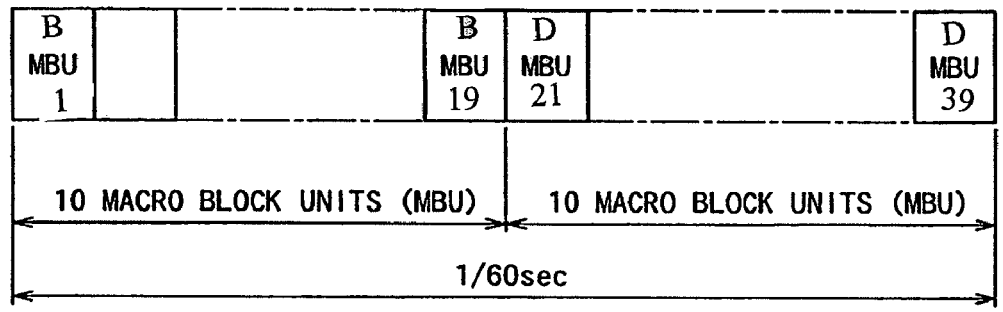

The first ten MBUs of the MPEG stream outputted from the Enc_B are outputted in the order of MBU 1, MBU 3, MBU 5, ..., MBU 19 to which the macro blocks of the shuffling group B are assigned, as shown in FIG. 9B. The MBUs to be outputted next are outputted in the order of MBU 21, MBU 23, MBU 25, ..., MBU 39 to which the macro blocks of the shuffling group D are assigned. Note that the time required until the twenty MBUs 1 to 39 are outputted is 1/60 second equivalent to one frame, too.

The MPEG streams outputted from the variable-length encoding circuits 16 are subjected to an interleave processing by the ECC encoder 17 such that the twenty MBUs 0 to 19 can be recorded on twelve tracks in the first half of the recording medium 3, and the other twenty MBUs of MBU 20 to 39 can be recorded on twelve tracks in the last half of the recording medium 3.

Figure 10:
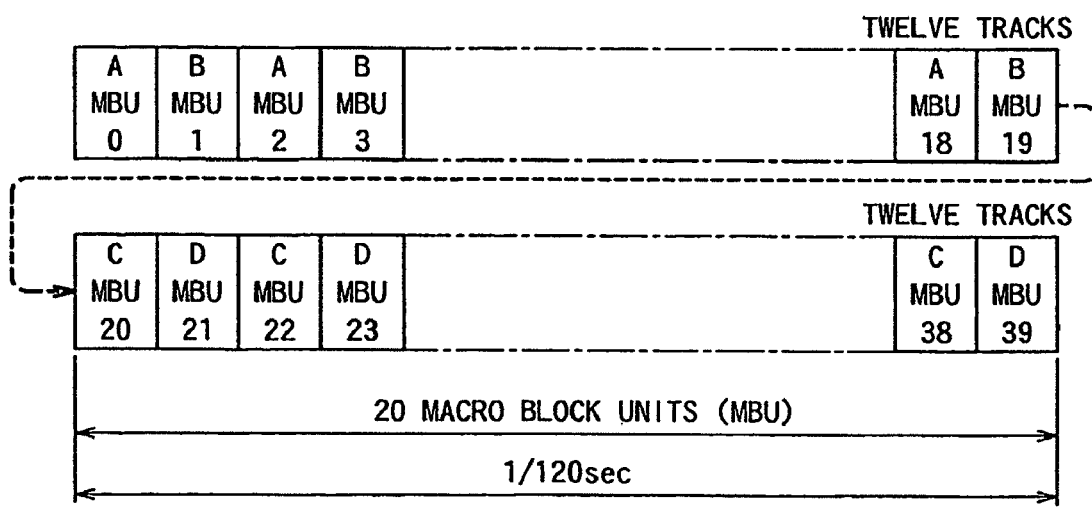
FIG. 10 is a diagram showing MBUs of the first digital image signal 422 (60P) recorded on the twelve tracks in the first or last half of the recording medium.

As a result of this, as shown in FIG. 10, the MPEG stream outputted from the ECC encoder 17 is outputted in the order starting from the MBU 0 to MBU 1, MBU 2, ..., MBU 18, MBU 19, in accordance with the order in which the stream is recorded on the twelve tracks in the first half of the recording medium 3. Thereafter, the MPEG stream is outputted in the order starting from the MBU 20 to MBU 21, MBU 22, ..., MBU 38, MBU 39, in accordance with the order in which the stream is recorded on the twelve tracks in the last half of the recording medium 3. This output order of MBUs is the same as that of the second digital image signals 422 (30P) shown in FIG. 5 described previously. Note that the macro blocks constituting each MBU are the same as those of the second digital image signals 422 (30P). Hence, it is possible to say that the macro blocks forming the first digital image signals 422 (60P) are shuffled by the shuffling section 13 into a layout of macro blocks which is equivalent to that of the second digital image signals 422 (30P).

Digital image signals are recorded in units of MBUs onto the twelve tracks in the first or last half of the recording medium 3. Each MBU is constituted only by macro blocks discretely existing in a frame. Therefore, even if digital image signals are lost in units of MBUs, only the pixel areas forming the macro blocks discretely existing in a frame are lost, like in the case of the second digital image signals 422 (30P), and adjacent macro blocks in the frame are not sequentially lost. Accordingly, with respect to the pixel areas of the lost macro blocks, luminance signals can be easily specified based on the pixels forming the other pixels adjacent to the lost macro blocks.

Also, like in the case of the second digital image signals 422 (30P), MBUs 0 to 19 which constitute the shuffling groups A and B are assigned to the twelve tracks in the first half of the recording medium 3, and MBUs 20 to 39 which constitute shuffling groups C and D are assigned to the twelve tracks in the last half. Therefore, even if the first twelve tracks are all lost, only the macro blocks which constitute the shuffling groups A and B are all lost, but the shuffling groups C and D remain, like the case of FIG. 6A. Accordingly, with respect to the pixel areas of the macro blocks constituting the lost shuffling groups A and B, luminance signals can be easily specified based on the pixels forming the macro blocks of adjacent shuffling groups C and D.

The shuffling section 13 forming part of the recorder 1 to which the present invention is applied shuffles inputted first digital image signals 422 (60P) so as to have a macro block structure equivalent to that of second digital image signals 422 (30P). The first digital image signals 422 (60P) shuffled based on this rearranging method and recorded on the recording medium 3 necessitate no interpolation processing when performing so-called ½-speed reproduction in which the tape speed during reproduction is set to ½ of that during recording. Therefore, the resolution can be prevented from deterioration. In addition, since a reproduction processing equivalent to that effected on the second digital image signals 422 (30P) is executed, it is possible to cope with the processing during reproduction by only one decoder (FIG. 2B). Therefore, decoders need not be developed respectively for individual formats, so that the development costs of the whole apparatus can be reduced, and the development period can be shortened.

Next, a description will be made of an example in which the compression ratio is 2:1 in a case where inputted digital image signals are recorded in different formats respectively for different frame rates (30 and 60 frames/second), based on a 4:4:4 format, in the recorder 1 to which the present invention is applied.

In the shuffling section 13, digital image signals at a frame rate of 60 frames/second are referred to as first digital image signals 444 (60P), and digital image signals at another frame rate of 30 frames/second which is the half of that of the first digital image signals 444 (60P) are referred to as second digital image signals 444 (30P). At this time, inputted first digital image signals 444 (60P) are shuffled so as to have a macro block structure equivalent to that of the second digital image signals 444 (30P). In other words, the shuffling section 13 rearranges macro blocks of the first digital image signals 444 (60P), based on a method of rearranging macro blocks of the second digital image signals 444 (30P).

The method of rearranging the second digital image signals 444 (30P) which should be referred to when macro blocks of the first digital image signals 444 (60P) are rearranged will be as follows.

That is, as shown in FIG. 11, the dividing section 12 divides the second digital image signals 444 (30P) inputted from the input terminal 11 in units of frames (1920×1080 pixels), at 1 frame per ⅟30 second, into macro blocks each consisting of 16×16 pixels. The number of macro blocks forming one frame is 120×68=8160.

The shuffling section 13 groups the macro blocks divided by the dividing section 12 and discretely existing in a frame, into eight shuffling groups A, B, C, D, E, F, G, and H. Suppose that block Nos. are assigned to 120 macro blocks positioning in the uppermost line, in the order from A to D in the horizontal direction from the left upper block, e.g., in the order of A0, B0, C0, D0, A1, B1, C1, D1, ..., C29, D29. At this time, thirty macro blocks are grouped into each of shuffling groups A to D, e.g., A0 to A29 are assigned to the shuffling group A, B0 to B29 to the shuffling group B, C0 to C29 to the shuffling group C, as well as D0 to D29 to the shuffling group D.

In the second line from the upper side, block Nos. are assigned in the order from E to H, e.g., E0, F0, G0, H0, E1, F1, G1, H1, ..., G29, H29. At this time, thirty macro blocks are assigned to each group, e.g., E0 to E29 are assigned to the shuffling group E, F0 to F29 to the shuffling group F, G0 to G29 to the shuffling group G, as well as H0 to H29 to the shuffling groups H.

In the third line from the upper side, block Nos. are assigned in the order from H to E, e.g., H30, G30, F30, E30, H31, G31 ..., F59, E59. The macro blocks are thus assigned to the shuffling groups E, F, G, and H.

In the fourth line from the upper side, block Nos. are assigned in the order from D to A, e.g., D30, C30, B30, A30, D31, C31 ..., B59, A59. The macro blocks are thus assigned to the shuffling groups A, B, C, and D. In the fourth line from the upper side, block Nos. are assigned in the order from A to D as in the case of the uppermost line.

Thus, the shuffling section 13 groups the macro blocks existing in a frame into the shuffling groups, sequentially assigning the block Nos. to the macro blocks, considering every four lines as one set. In this manner, each of the shuffling groups A to H can be constituted by 8160/8=1020 macro blocks which discretely exist in a frame.

The above-described grouping method using the shuffling groups A to H is merely an example, and grouping can be achieved in any other method.

The first digital image signals 444 (60P) are compression-encoded with use of two variable-length encoding circuits 16 (EncA and Enc_B). Therefore, the shuffling section 13 assigns the shuffling groups A, C, F, and H among the eight shuffling groups A to H to the Enc_A side, as well as the shuffling groups B, D, E, and G to the Enc_B side.

FIG. 12A shows a case where the shuffling groups A, C, F, and H are rearranged in order to perform encoding in the Enc_A. As shown in this FIG. 12A, the digital image signals encoded by the Enc_A are constituted by 60×68=4080 macro blocks. Likewise, the digital image signals encoded by the Enc_B are constituted by 60×68=4080 macro blocks, too, as shown in FIG. 12B.

The shuffling section 13 rearranges the macro blocks which belong to the shuffling groups A, C, F, and H to be encoded by the Enc_A, in the order from A to C in the horizontal direction from the left upper side as shown in FIG. 12A, e.g., in the order of A0, C0, A1, C1, A2, . . . , A29, C29. In the second line from the upper side, the macro blocks are rearranged in the order from F to H, e.g., in the order of F0, H0, F1, H1, F2, . . . , F29, H29. In the third line from the upper side, the macro blocks are rearranged in the order from H to F in the horizontal direction from the left side, e.g., in the order of H30, F30, H31, F31, H32 . . . , F59. In the fourth line from the upper side, the macro blocks are rearranged in the order from C to A in the horizontal direction from the left side, e.g., in the order of C30, A30, C31, A31, C32, . . . , A59.

Thus, the shuffling section 13 rearranges the macro blocks shown in FIG. 11 such that the macro blocks constituting the shuffling groups B, D, E, and G are suppressed.

Similarly, the macro blocks which belong to the shuffling groups B, D, E, and G to be encoded by the Enc_B are rearranged in the order from B to D in the horizontal direction from the left upper side as shown in FIG. 12B, e.g., in the order of B0, D0, B1, D1, . . . , B29, D29. In the second line from the upper side, the macro blocks are rearranged in the order from E to G, e.g., in the order of E0, G0, E1, G1, E2, . . . , E29, G29. In the third line from the upper side, the macro blocks are rearranged in the order from G to E in the horizontal direction from the left side, e.g., in the order of G30, E30, G31, E31, G32, . . . , E59. In the fourth line from the upper side, the macro blocks are rearranged in the order from D to B in the horizontal direction from the left side, e.g., in the order of D30, B30, D31, B31, D32, . . . , B59.

Thus, the shuffling section 13 rearranges the macro blocks shown in FIG. 11 such that the macro blocks constituting the shuffling groups A, C, F. and H are suppressed.

Next, as shown in FIG. 13, the shuffling section 13 creates macro block units (hereinafter referred to as MBUs) each consisting of 102 macro blocks, for every one of the shuffling groups A to H. That is, 1020/102=10 MBUs can be assigned to each of the shuffling groups A to H, and every one frame can be constituted by 8160/102=80 MBUs. In FIG. 13, MBUs 0, 2, 4, 6, . . . , 36, 38 which belong to the shuffling groups A, C, F, and H to be encoded by the Enc_A are listed in the left side, while MBUs 1, 3, 5, 7, . . . , 37, 39 which belong to the shuffling groups B, D, G, and H to be encoded by the Enc_B are listed in the right side.

In FIG. 13, where the numbers for identifying MBUs are orderly MBU 0, MBU 1, MBU 2, . . . , MBU 38, MBU 39, the macro blocks A0, A1, A2, . . . , A1019 which belong to the shuffling group A are assigned to any of the MBU 0, MBU 4, MBU 8, MBU 12, and MBU 16. Also, the macro blocks B0, B1, B2, . . . , B1019 which belong to the shuffling group B are assigned to any of MBU 1, MBU 5, MBU 9, MBU 13, and MBU 17. Also, the macro blocks C0, C1, C2, . . . , C1039 which belong to the shuffling group C are assigned to any of MBU 22, MBU 26, MBU 30, MBU 34, and MBU 38. Further, the macro blocks D0, D1, D2, . . . , D1019 which belong to the shuffling group D are assigned to any of MBU 23, MBU 27, MBU 31, MBU 35, and MBU 39. The macro blocks which belong to the other shuffling groups E, F, G, and H are also assigned to the MBUs shown in FIG. 13. Note that each MBU is assigned with macro blocks of every fifth block No.

That is, by extracting macro blocks for every fifth block No., these MBUs can be constituted only by those macro blocks that are not adjacent to each other but exist discretely in a frame.

Figure 14A:
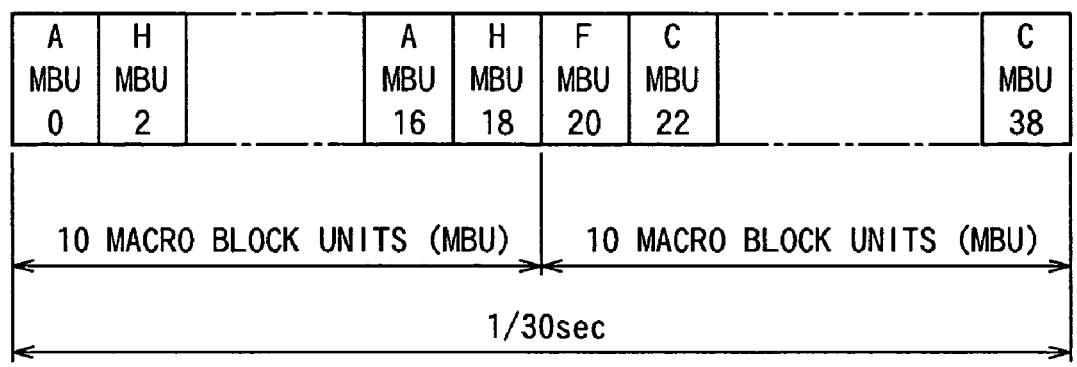
FIGS. 14A and 14B are diagrams showing MPEG streams of the second digital image signals 444 (30P)

After the macro blocks are rearranged as described above by the shuffling section 13, the digital image signals are encoded by Enc_A and Enc_B as the variable-length encoding circuits 16. As a result, as the first ten MBUs of the MPEG stream outputted from the Enc_A, as shown in FIG. 14A, the MBU 0, MBU 4, . . . , MBU 16 to which the macro blocks of the shuffling group A are assigned and the MBU 2, MBU 6, MBU 10, . . . , MBU 18 to which the macro blocks of the shuffling group H are assigned are outputted alternately starting from the MBU 0. As ten MBUs to be outputted next, the MBU 20, MBU 24, MBU28, . . . , MBU 36 to which the macro blocks of the shuffling group F are assigned and the MBU 22, MBU 26, MBU 30, . . . , MBU 38 to which the macro blocks of the shuffling group C are assigned are outputted alternately starting from the MBU 20. Note that the time required until the twenty MBUs 0 to 19 are outputted is 1/30 second equivalent to one frame.

Figure 14B:
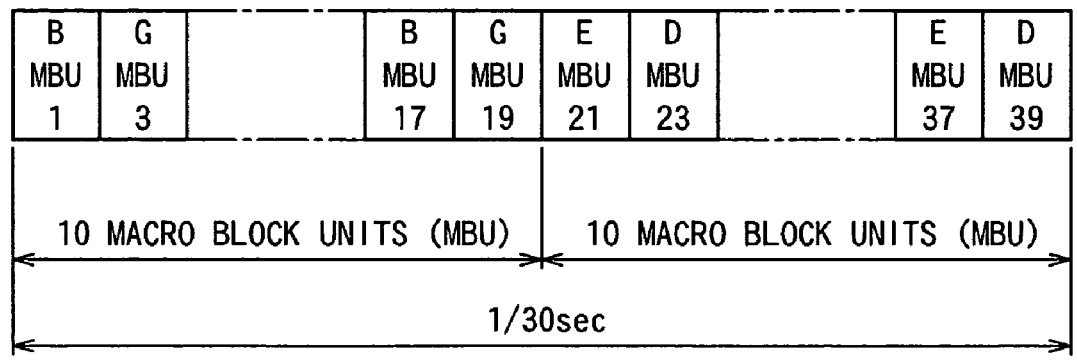

On the other side, as the first ten MBUs of the MPEG stream outputted from the Enc_B, as shown in FIG. 14B, the MBU 1, MBU 5, . . . , MBU 17 to which the macro blocks of the shuffling group B are assigned and the MBU 3, MBU 7, MBU 11, . . . , MBU 19 to which the macro blocks of the shuffling group G are assigned are outputted alternately starting from the MBU 1. As ten MBUs to be outputted next, the MBU 21, MBU 25, MBU29, . . . , MBU 37 to which the macro blocks of the shuffling group E are assigned and the MBU 23, MBU 27, MBU 31, . . . , MBU 39 to which the macro blocks of the shuffling group D are assigned are outputted alternately starting from the MBU 21. Note that the time required until the twenty MBUs 1 to 39 are outputted is 1/30 second equivalent to one frame.

The MPEG streams outputted from the variable-length encoding circuits 16 are subjected to an interleave processing by the ECC encoder 17 such that the twenty MBUs to which the macro blocks of the shuffling groups A, B, H, and G are assigned, e.g., MBU 0, MBU 1, MBU 2, MBU 3, . . . , MBU 19, can be recorded on twenty four tracks in the first half of the recording medium 3, and the other twenty MBUs to which the macro blocks of the shuffling groups F, E, C, and D are assigned, e.g., MBU 20, MBU 21, MBU 22, MBU 23, . . . , MBU 39, can be recorded on twenty four tracks in the last half of the recording medium 3.

Figure 15:
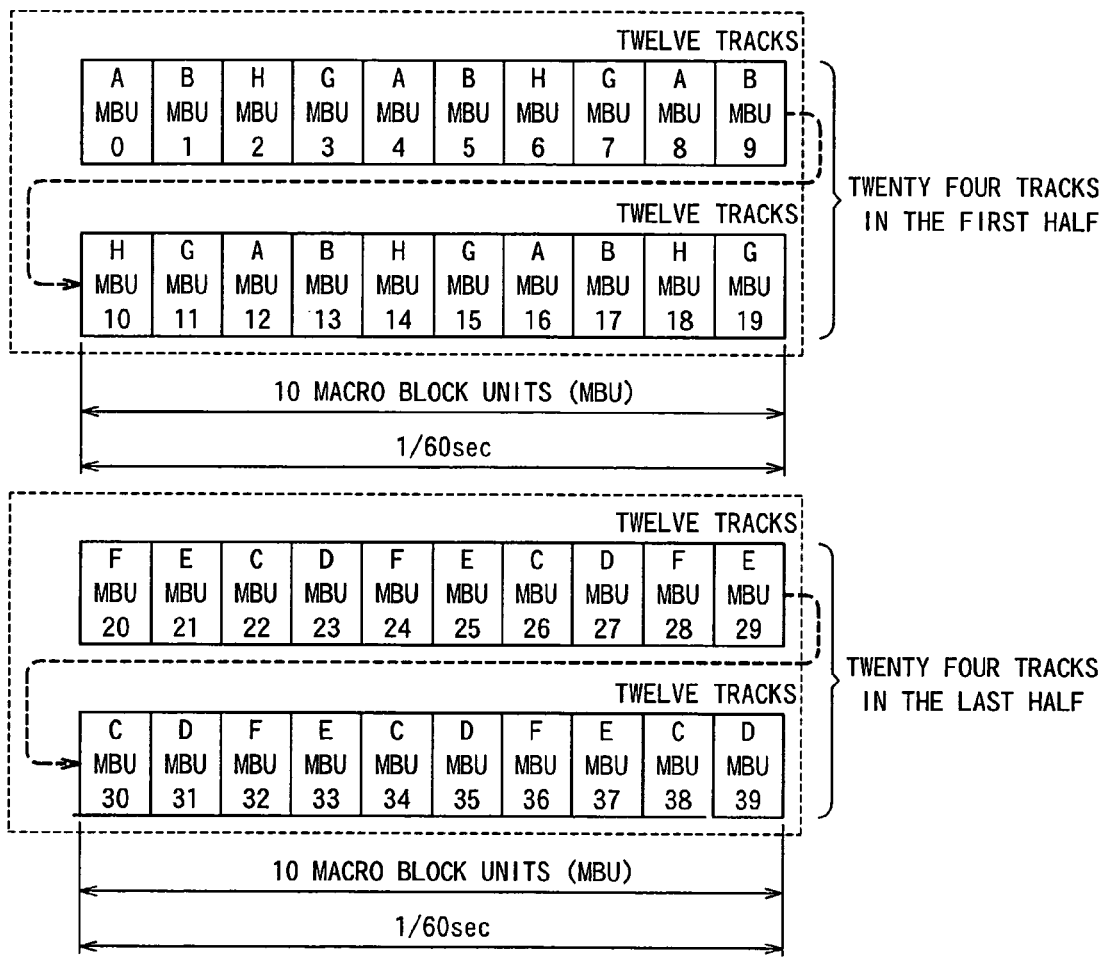
FIG. 15 is a diagram showing MBUs of the second digital image signals 444 (30P) recorded on twelve tracks in the first or last half of a recording medium.

As a result of this, as shown in FIG. 15, the MPEG stream outputted from the ECC encoder 17 is outputted in the order starting from the MBU 0 to MBU 1, MBU 2, . . . , MBU 18, MBU 19, in accordance with the order in which the stream is recorded on the twenty four tracks in the first half of the recording medium 3. Thereafter, the MPEG stream is outputted in the order starting from the MBU 20 to MBU 21, MBU 22, . . . , MBU 38, MBU 39, in accordance with the order in which the stream is recorded on the twenty four tracks in the last half of the recording medium 3.

Digital image signals are recorded in units of MBUs onto the twenty four tracks in the first or last half of the recording medium 3. Each MBU is constituted only by macro blocks discretely existing in a frame. Therefore, even if digital image signals are lost in units of MBUs, only the pixel areas forming the macro blocks discretely existing in a frame are lost, and macro blocks adjacent to each other in the frame are not sequentially lost. Accordingly, with respect to the pixel areas of the lost macro blocks, luminance signals can be easily specified based on the pixels forming the other macro blocks adjacent to the lost macro blocks.

In this rearranging method, MBUs 0 to 19 constituting the shuffling groups A, B, H, and G are assigned to the first twenty four tracks of the recording medium 3, and MBUs 20 to 39 constituting the shuffling groups F, E, C, and D are assigned to the last twenty four tracks. Therefore, even if all the first twenty four tracks are lost from the recording medium, the macro blocks constituting the shuffling groups F, E, C, and D adjacent thereto remain. Accordingly, with respect to the pixel areas of the lost macro blocks constituting the shuffling groups A, B, H, and G, luminance signals can be easily specified based on the pixels forming the macro blocks of adjacent shuffling groups F, E, C, and D. It is thus possible to easily compensate for the pixel areas of lost macro blocks even if all the last twenty four tracks are lost from the recording medium 3.

That is, the order of macro blocks is rearranged with respect to the second digital image signals 444 (30P), as described above. As a result of this, even if the digital image signals are lost in units of MBUs during recording or reproduction, only the macro blocks which discretely exist are lost as in the case of the 4:2:2 format, and lost pixel areas can be easily compensated for based on other adjacent macro blocks.

Note that the method of rearranging the macro blocks of the second digital image signals 444 (30P) is not limited to the method described above. It may be arranged such that the combinations of shuffling groups to which the MBUs are assigned can be changed freely.

The shuffling section 13 rearranges inputted first digital image signals 444 (60P) in a manner described below, in accordance with the above-described method of rearranging macro blocks of the second digital image signals 444 (30P).

That is, the dividing section 12 divides the first digital image signals 444 (60P) inputted from the input terminal 11 in units of frames (1920×1080 pixels) at 1 frame per 1/60 second, into macro blocks each consisting of 16×16 pixels. The dividing method in the dividing section 12 is the same as the method of dividing the second digital image signals 444 (30P) into macro blocks, and the signals can be divided into 120×68=8160 macro blocks for every frame.

The shuffling section 13 assigns macro blocks divided by the dividing section 12 and discretely existing in a frame, into eight shuffling groups A to H. The method of assigning the macro blocks to the shuffling groups is the same as that in the foregoing case of the second digital image signals 444 (30P). Therefore, a detailed description of the method is omitted herefrom by referring to the foregoing description with reference to FIG. 11.

The first digital image signals 444 (60P) are compression-encoded with use of four variable-length encoding circuits 16 (the four variable-length encoding circuits will be hereinafter referred to as Enc_A, Enc_B, Enc_C, and Enc_D). Therefore, the shuffling section 13 assigns the shuffling groups A and F among the eight shuffling groups A to H, to the Enc_A, the shuffling groups B and E to the Enc_B, the shuffling groups C and H to the Enc_C, as well as the shuffling groups D and G to the Enc_D.

Figure 16A:
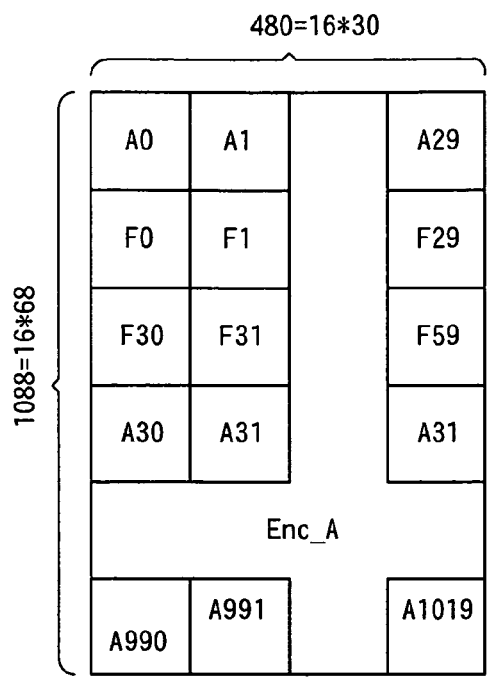
FIGS. 16A to 16D are diagrams showing a case where respective shuffling groups of the first digital image signals 444 (60P) are rearranged.

FIG. 16A shows a case where the shuffling groups A and F are rearranged in order to perform encoding in the Enc_A. As shown in FIG. 16A, the digital image signals encoded by each of the variable-length encoding circuits 16 (Enc_A, Enc_B, Enc_C, and Enc_D) are constituted by 30×68=2040 macro blocks.

With respect to the macro blocks which belong to the shuffling groups A and F to be encoded by the Enc_A, the shuffling section 13 rearranges the macro blocks constituting the shuffling group A, in the horizontal direction from the left upper side as shown in FIG. 16A, e.g., in the order of A0, A1, A2, ..., A29. In the second line from the upper side, the macro blocks constituting the shuffling group F are rearranged in the horizontal direction from the left end, e.g., in the order of F0, F1, F2, ..., F29. Thus, the shuffling section 13 rearranges the macro blocks shown in FIG. 11 such that the macro blocks except the shuffling groups A and F are suppressed.

Figure 16B:
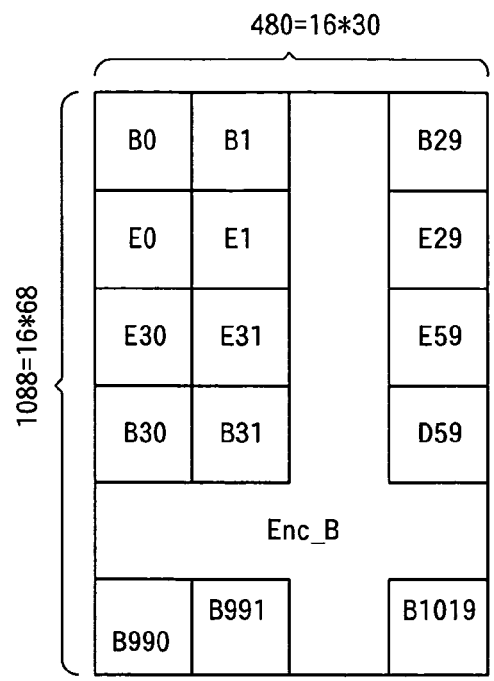
Figure 16C:
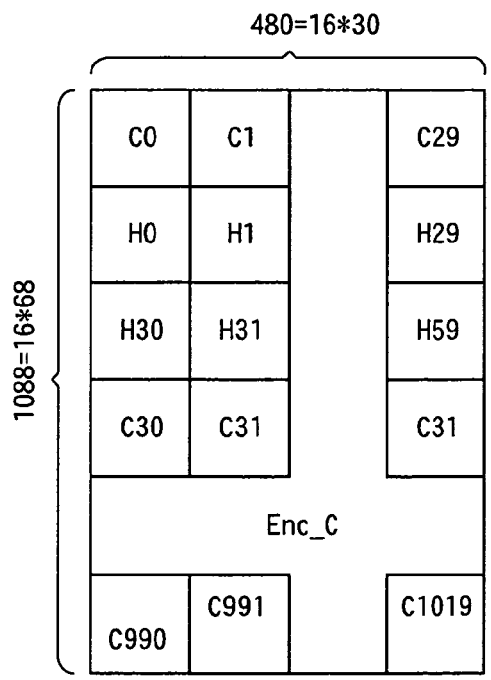
Figure 16D:
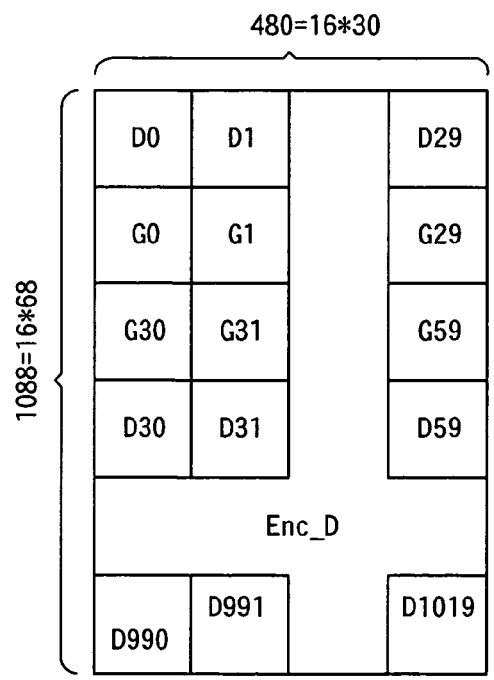

Likewise, with respect to the macro blocks which belong to the shuffling groups B and D to be encoded by the Enc_B, the shuffling section 13 rearranges the macro blocks by suppressing the macro blocks of the other shuffling groups, as shown in FIG. 16B. Also, with respect to the macro blocks which belong to the shuffling groups C and H to be encoded by the Enc_C, the shuffling section 13 rearranges the macro blocks by suppressing the macro blocks of the other shuffling groups, as shown in FIG. 16C. Also, with respect to the macro blocks which belong to the shuffling groups D and G to be encoded by the Enc_D, the shuffling section 13 rearranges the macro blocks by suppressing the macro blocks of the other shuffling groups, as shown in FIG. 16D.

Next, as shown in FIG. 17, the shuffling section 13 creates MBUs each consisting of 102 macro blocks, for every one of the shuffling groups A to H. The macro blocks assigned to each MBU are the same as those in the foregoing case of the second digital image signals 422 (30P), and therefore, a detailed description thereof is omitted herefrom. FIG. 17 shows MBUs 0, 4, ..., 32, 36 which belong to the shuffling groups A and F to be encoded by the Enc_A, MBUs 1, 5, ..., 33, 37 which belong to the shuffling groups B and E to be encoded by the Enc_B, MBUs 2, 6, ..., 34, 38 which belong to the shuffling groups C and H to be encoded by the Enc_C, MBUs 3, 7, ..., 35, 39 which belong to the shuffling groups D and G to be encoded by the Enc_D.

After the macro blocks are rearranged by the shuffling section 13, the digital image signals are encoded by the Enc_A to Enc_D as the variable-length encoding circuits 16. As a result, as shown in FIG. 18, the first five MBUs of the MPEG stream outputted from the Enc_A are outputted in the order of MBU 0, MBU 4, MBU 8, ..., MBU 16 to which the macro blocks of the shuffling group A are assigned. Five MBUs to be outputted next are outputted in the order of MBU 20, MBU 24, MBU 28, ..., MBU 36 to which the macro blocks of the shuffling group F are assigned. Note that the time required until the ten MBUs 0 to 36 are outputted is 1/60 second equivalent to one frame.

The first five MBUs of the MPEG stream outputted from the Enc_B are outputted in the order of MBU 1, MBU 5, MBU 9, ..., MBU 17 to which the macro blocks of the shuffling group B are assigned. Five MBUs to be outputted next are outputted in the order of MBU 21, MBU 25, MBU 29, ..., MBU 37 to which the macro blocks of the shuffling group E are assigned.

Similarly, the first five MBUs of the MPEG stream outputted from the Enc_C are outputted in the order of MBU 2, MBU 6, MBU 10, ..., MBU 18 to which the macro blocks of the shuffling group H are assigned. Five MBUs to be outputted next are outputted in the order of MBU 22, MBU 26, MBU 30, ..., MBU 38 to which the macro blocks of the shuffling group C are assigned.

Also similarly, the first five MBUs of the MPEG stream outputted from the Enc_D are outputted in the order of MBU 3, MBU 7, MBU 11, ..., MBU 19 to which the macro blocks of the shuffling group G are assigned. Five MBUs to be outputted next are outputted in the order of MBU 23, MBU 27, MBU 31, ..., MBU 39 to which the macro blocks of the shuffling group D are assigned.

The MPEG streams outputted from the variable-length encoding circuits 16 are subjected to an interleave processing by the ECC encoder 17 such that the twenty MBUs to which the macro blocks of the shuffling groups A, B, H, and G are assigned, e.g., MBU 0, MBU 1, MBU 2, MBU 3, . . . , MBU 19 can be recorded on twelve tracks in the first half of the recording medium 3, and the twenty MBUs to which the macro blocks of the shuffling groups F, E, C, and D are assigned, e.g., MBU 20, MBU 21, MBU 22, MBU 23, . . . , MBU 39 can be recorded on twelve tracks in the last half of the recording medium 3.

Figure 19:
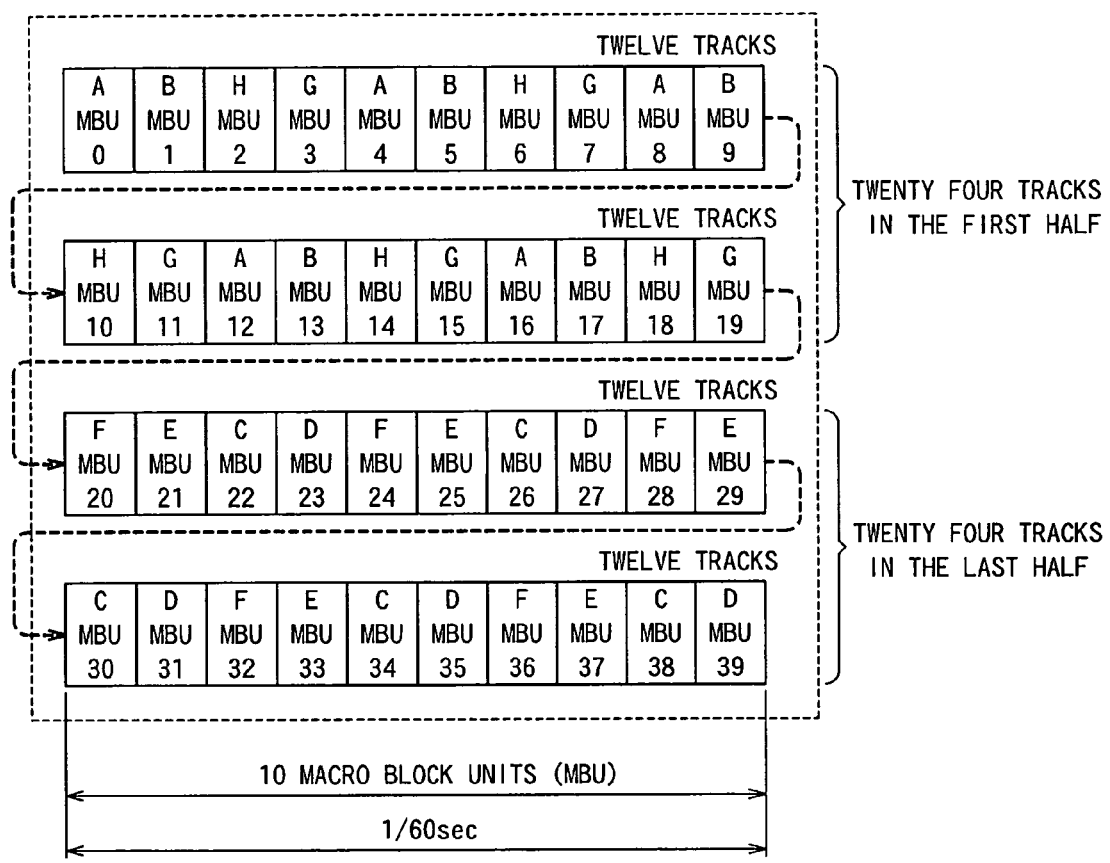
FIG. 19 is a diagram showing MBUs of the second digital image signals 444 (30P) recorded on twelve tracks in the first or last half of a recording medium.

As a result of this, as shown in FIG. 19, the MPEG stream outputted from the ECC encoder 17 is outputted in the order starting from the MBU 0 to MBU 1, MBU 2, . . . , MBU 18, MBU 19, in accordance with the order in which the stream is recorded on the twelve tracks in the first half of the recording medium 3. Thereafter, the MPEG stream is outputted in the order starting from the MBU 20 to MBU 21, MBU 22, . . . , MBU 38, MBU 39, in accordance with the order in which the stream is recorded on the twelve tracks in the last half of the recording medium 3.

This output order of MBUs is the same as that of the second digital image signals 444 (30P) shown in FIG. 15 described previously. Note that the macro blocks constituting each MBU are the same as those of the second digital image signals 444 (30P). Hence, it is possible to say that the macro blocks forming the first digital image signals 444 (60P) are shuffled by the shuffling section 13 into a layout of macro blocks which is equivalent to that of the second digital image signals 444 (30P).

In the recorder 1 to which the present invention is applied, inputted first digital image signals 444 (60P) are shuffled so as to have a macro block structure equivalent to that of second digital image signals 444 (30P). The first digital image signals 444 (60P) shuffled based on this rearranging method and recorded on the recording medium 3 necessitate no interpolation processing when performing so-called ½-speed reproduction in which the tape speed during reproduction is set to ½ of that during recording. Therefore, the resolution can be prevented from deterioration. In addition, since a reproduction processing equivalent to that effected on the second digital image signals 444 (30P) is executed, it is possible to cope with the processing during reproduction by only two decoders, i.e., the number of decoders is reduced by half. Therefore, decoders need not be developed respectively for individual formats, so that the development costs of the whole signal processor can be reduced, and the development period can be shortened.

The foregoing 4:4:4 format has been described with reference to a case where one macro block is constituted by two sync blocks (544 byte) by setting the compression ratio to 2:1. The present invention is not limited to this case. For example, as shown in FIG. 20, one macro block may be constituted by one sync block (272 byte) by setting the compression ratio to 4:1. In this case, the shuffling method is the same as that in the case of setting the compression ratio of 2:1.

In case where the compression ratio of the second digital image signals 444 (30P) is set to 4:1, the MPEG stream outputted from the ECC encoder 17 is outputted in the order starting from the MBU 0 to MBU 1, MBU 2, . . . , MBU 18, MBU 19, in accordance with the order in which the stream is recorded on the twelve tracks in the first half of the recording medium 3, as shown in FIG. 21. Thereafter, the MPEG stream is outputted in the order starting from the MBU 20 to MBU 21, MBU 22, . . . , MBU 38, MBU 39, in accordance with the order in which the stream is recorded on the twelve tracks in the last half of the recording medium 3.

Likewise, in case where the compression ratio of the first digital image signals 444 (60P) is set to 4:1, the MPEG stream outputted from the ECC encoder 17 is outputted in the order starting from the MBU 0 to MBU 1, MBU 2, . . . , MBU 18, MBU 19, in accordance with the order in which the stream is recorded on the twelve tracks in the first half of the recording medium 3, as shown in FIG. 22. Thereafter, the MPEG stream is outputted in the order starting from the MBU 20 to MBU 21, MBU 22, . . . , MBU 38, MBU 39, in accordance with the order in which the stream is recorded on the twelve tracks in the last half of the recording medium 3.

That is, if the compression ratio is set to 4:1 in the 4:4:4 format, every twenty MBUs of MBU 1 to MBU 19 and MBU 20 to MBU 39 are recorded on twelve tracks which are reduced by half compared with the case of setting the compression ratio to 2:1, as shown in FIGS. 21 and 22.

Even if the compression ratio is thus changed, no interpolation processing is necessitated when performing so-called ½-speed reproduction since the method of shuffling the first digital image signals 444 (60P) is arranged to comply with the method of shuffling the second digital image signals 444 (30P). Therefore, the resolution can be prevented from deterioration, and the number of decoders is reduced by half.

The present invention is applicable not only to the recorder 1 described above but also to, for example, a compression encoder which rearranges macro blocks of the first digital image signals on the basis of the method of rearranging macro blocks of second digital image signals. Alternatively, the present invention is applicable to a player for reproducing a recording medium subjected to recording by the recorder 1. The player can ensure an advantage in that processing capabilities saved by reducing the number of decoders can be used for the other processings when a recording medium 3 on which the first digital image signals have been recorded is subjected to so-called ½-speed reproduction.

The frame rate of the first digital image signals is not limited to 60 frames/second but may be, for example, 59.94 frames/second. Furthermore, the frame rate of this first digital image signals may be any frame rate, e.g., 120 frames/second, etc. The above description has been made of an example in which the frame rate of the second digital image signals is half of that of the first digital image signals. The present invention is not limited to this case. Needless to say, the first and second digital image signals need only to have different frame rates from each other.

The invention claimed is:

1. A compression encoder which compresses input first and second digital image signals having frame rates different from each other, based on a same encoding system, comprising:

a dividing section which divides each inputted first and second digital image signals into plural macro blocks of orthogonal-transformation blocks for each frame thereof;

a shuffling section which, for each of the first and second digital image signals, rearranges the macro blocks in each frame into groups and creates macro block units for every group; and a compression-encoding section which compression-encodes, based on the frame rate, each of the first and second digital image signals for every macro block unit consisting of plural macro blocks rearranged by the shuffling section, wherein the shuffling section rearranges the macro blocks of the first digital image signals such that an output order of the macro block units of the first digital image signals after compression-encoding at the first frame rate is equivalent to the output order of the macro block units of the second digital image signals after compression-encoding at the second frame rate.

2. The compression encoder according to claim 1, wherein the shuffling section rearranges the divided macro blocks of the second digital image signals into a layout in which the divided macro blocks of the second digital image signals are arranged mutually in a dispersed position.

3. The compression encoder according to claim 1, wherein the compression-encoding section compression-encodes the first digital image signals having a frame rate of 60 or 59.94 frames/second.

4. The compression encoder according to claim 1, wherein the compression-encoding section compression-encodes the digital image signals, based on a 4:2:2 format or 4:4:4 format.

5. The compression encoder according to claim 1, wherein the compression-encoding section compression-encodes the digital image signals according to an interlace format or a progressive format.

6. A compression-encoding method of compressing input first and second digital image signals having frame rates different from each other, based on a same encoding system, comprising:
   a dividing step of dividing each inputted first and second digital image signals into plural macro blocks of orthogonal-transformation blocks for each frame thereof;
   a shuffling step of, for each of the first and second digital image signals, rearranging the macro blocks in each frame into groups and creating macro block units for every group; and
   a compression-encoding step of compression-encoding, based on the frame rate, each of the first and second digital image signals for every macro block unit consisting of plural macro blocks rearranged by the shuffling step, wherein
   in the shuffling step, the macro blocks of the first digital image signals are rearranged such that an output order of the macro block units of the first digital image signals after compression-encoding at the first frame rate is equivalent to the output order of the macro block units of the second digital image signals after compression-encoding at a second frame rate.

7. The compression-encoding method according to claim 6, wherein in the shuffling step, the divided macro blocks of the second digital image signals are rearranged into a layout in which the divided macro blocks of the second digital image signals are arranged mutually in a dispersed position.

8. The compression encoding method according to claim 6, wherein in the compression-encoding step, the first digital image signals having a frame rate of 60 or 59.94 frames/second are compression-encoded.

9. The compression-encoding method according to claim 6, wherein in the compression-encoding step, the digital image signals are compression-encoded, based on a 4:2:2 format or 4:4:4 format.

10. The compression-encoding method according to claim 6, wherein in the compression-encoding step, the digital image signals are compression-encoded, according to an interlace format or a progressive format.

11. A recorder which compresses input first and second digital image signals having frame rates different from each other, based on a same encoding system, and records the digital image signals compressed, onto a recording medium, comprising:
   a dividing section which divides each inputted first and second digital image signals into plural macro blocks of orthogonal-transformation blocks for each frame thereof;
   a shuffling section which, for each of the first and second digital image signals, rearranges the macro blocks in each frame into groups and creates macro block units for every group each including plural macro blocks;
   a compression-encoding section which compression-encodes, based on frame rate, each of the first and second digital image signals for every macro block unit consisting of plural macro blocks rearranged by the shuffling section; and
   a recording section which records the digital image signals compression-encoded by the compression-encoding section, in units of a macro block unit by assigning half the macro block units to first tracks of a record medium and remaining macro block units to last tracks of the recording medium,
   wherein the shuffling section rearranges the macro blocks of the first digital image signals such that an output order of the macro block units of the first digital image signals after compression-encoding at a first frame rate is equivalent to the output order of the macro block units of the second digital image signals after compression-encoding at a second frame rate.

12. The recorder according to claim 11, wherein the shuffling section forms the macro block units each of those plural macro blocks that are divided by the dividing section and discretely exist in a frame.

13. The recorder according to claim 12, wherein the recording section selects one or more macro block units to be assigned to each track of the recording medium.

14. The recorder according to claim 12, wherein the recording section assigns the macro block units to each track of the recording medium, positioning discretely those macro blocks that are divided by the dividing section and are adjacent to each other.

15. The recorder according to claim 11, wherein the compression-encoding section compression-encodes the first digital image signals having a frame rate of 60 or 59.94 frames/second.

16. The recorder according to claim 11, wherein the compression-encoding section compression-encodes the digital image signals, based on a 4:2:2 format or 4:4:4 format.

17. The recorder according to claim 11, wherein the compression-encoding section compression-encodes the digital image signals according to an interlace format or a progressive format.

18. A recording method of compressing input first and second digital image signals having frame rates different from each other, based on a same encoding system, and recording the digital image signals compressed, onto a recording medium, comprising:
   a dividing step of dividing each inputted first and second digital image signals into plural macro blocks of orthogonal-transformation blocks for each frame thereof;
   a shuffling step of, for each of the first and second digital image signals, rearranging the macro blocks in each frame into groups and creating macro block units for every group each including plural macro blocks;
   a compression-encoding step of compression-encoding, based on frame rate, each of the first and second digital image signals for every macro block unit consisting of plural macro blocks rearranged by the shuffling step; and a recording step of recording the digital image signals compression-encoded by the compression-encoding step in units of a macro block unit by assigning half the macro block units to first tracks of a record medium and remaining macro block units to last tracks of the recording medium, wherein the shuffling step rearranges the macro blocks of the first digital image signals such that an output order of the macro block units of the first digital image signals after compression-encoding at a first frame rate is equivalent to the output order of the macro block units of the second digital image signals after compression-encoding at a second frame rate.

19. The recording method according to claim 18, wherein in the shuffling step, the macro block units are each formed of those plural macro blocks that are divided by the dividing step and discretely exist in a frame.

20. The recording method according to claim 19, wherein in the recording step, one or more macro block units to be assigned to each track of the recording medium are selected.

21. The recording method according to claim 19, wherein in the recording step, the macro block units are assigned to each track of the recording medium, positioning discretely those macro blocks that are divided by the dividing step and are adjacent to each other.

22. The recording method according to claim 18, wherein in the compression-encoding step, the first digital image signals having a frame rate of 60 or 59.94 frames/second are compression-encoded.

23. The recording method according to claim 18, wherein in the compression-encoding step, the digital image signals are compression-encoded, based on a 4:2:2 format or 4:4:4 format.

24. The recording method according to claim 18, wherein in the compression-encoding step, the digital image signals according to an interlace format or a progressive format are compression-encoded.

25. A compression encoder which compresses first and second digital image signals having frame rates different from each other, based on a same encoding system, comprising:
  a dividing section which divides the first digital image signals into plural macro blocks for each frame and which divides the second digital image signals into plural macro blocks for each frame;
  a shuffling section which rearranges the plural macro blocks in each frame of the second digital image signals into groups and creates macro block units for every group wherein the second digital image signals are rearranged into a layout of macro blocks units after compression encoding at a second frame rate which is equivalent to that of the first digital image signals after compression encoding at a first frame rate; and
  a compression-encoding section which compression-encodes, based on frame rate, each of the first and second digital image signals for every macro block unit consisting of plural macro blocks rearranged by the shuffling section.

26. A compression-encoding method of compressing first and second digital image signals having frame rates different from each other, based on a same encoding system, comprising:
  a dividing step of dividing the first digital image signals into plural macro blocks for each frame and dividing the second digital image signals into plural macro blocks for each frame;
  a shuffling step of rearranging the plural macro blocks in each frame of the second digital image signals into groups and creates macro block units for every group, wherein the second digital image signals are rearranged into a layout of macro blocks units after compression-encoding at a second frame rate which is equivalent to that of the first digital image signals after compression encoding at a first frame rate; and
  a compression-encoding step of compression-encoding, based on frame rate, each of the first and second digital image signals for every macro block unit consisting of plural macro blocks rearranged by the shuffling step.

27. A recorder which compresses first and second digital image signals having frame rates different-from each other, based on a same encoding system, and records the digital image signals compressed, onto a recording medium, comprising:
  a dividing section which divides the first digital image signals into plural macro blocks for each frame and which divides the second digital image signals into plural macro blocks for each frame;
  a shuffling section which rearranges the plural macro blocks in each frame of the second digital image signals into groups and creates macro block units for every group each including plural macro blocks, wherein the second digital image signals are rearranged into a layout of macro blocks units after compression-encoding at a second frame rate which is equivalent to that of the first digital image signals after compression-encoding at a first frame rate;
  a compression-encoding section which compression-encodes, based on frame rate, each of the first and second digital image signals for every macro block unit consisting of plural macro blocks rearranged by the shuffling section; and
  a recording section which records the digital image signals, in units of macro block unit by assigning half the macro block units to first tracks of a record medium and remaining macro block units to last tracks of the recording medium.

28. A recording method of compressing first and second digital image signals having frame rates different from each other, based on a same encoding system, and recording the digital image signals compressed, onto a recording medium, comprising:
  a dividing step of dividing the first digital image signals into plural macro blocks for each frame and dividing the second digital image signals into plural macro blocks for each frame;
  a shuffling step of rearranging the plural macro blocks in each frame of the second digital image signals into groups and creating macro block units for each group each including plural macro blocks, wherein the second digital image signals are rearranged into a layout of macro blocks units after compression-encoding at a second frame rate which is equivalent to that of the first digital image signals after compression-encoding at a first frame rate;
  a compression-encoding step of compression-encoding, based on frame rate, each of the first and second digital image signals for every macro block unit consisting of plural macro blocks rearranged by the shuffling step; and
  a recording step of recording the digital image signals in units of macro block unit by assigning half the macro block units to first tracks of a record medium and remaining macro block units to last tracks of the recording medium.

29. The compression encoder according to claim 1, wherein a number of encoders compression-encoding the first digital image signal being different from a number of encoders compression-encoding the second digital image signal.

30. The compression encoder according to claim 1, wherein macro block units are constituted by macro blocks that are not adjacent to each other but exist discretely in a same frame.

31. The compression encoder according to claim 1, wherein half of the macroblock units are recorded onto a beginning tracks of a recording medium and a remaining half of the macro block units are recorded onto ending tracks of the recording medium.

* * * * *

UNITED STATES PATENT AND TRADEMARK OFFICE
CERTIFICATE OF CORRECTION

| | | |
|---|---|---|
| PATENT NO. | : 7,636,394 B2 | Page 1 of 1 |
| APPLICATION NO. | : 10/816027 | |
| DATED | : December 22, 2009 | |
| INVENTOR(S) | : Ishii et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1070 days.

Signed and Sealed this

Ninth Day of November, 2010

David J. Kappos
*Director of the United States Patent and Trademark Office*